United States Patent [19]
Abramson et al.

[11] Patent Number: 5,664,137
[45] Date of Patent: Sep. 2, 1997

[54] METHOD AND APPARATUS FOR EXECUTING AND DISPATCHING STORE OPERATIONS IN A COMPUTER SYSTEM

[75] Inventors: Jeffrey M. Abramson, Aloha; Haitham Akkary; Atig A. Bajwa, both of Portland; Michael A. Fetterman; Andrew F. Glew, both of Hillsboro; Glenn J. Hinton, Portland; Joel Huang, Portland; Kris G. Konigsfeld, Portland; Paul D. Madland, Beaverton; Prem Pahlajrai, Cornelius, all of Oreg.

[73] Assignee: Intel Corporation, Santa Clara, Calif.

[21] Appl. No.: 525,499

[22] Filed: Sep. 7, 1995

Related U.S. Application Data

[63] Continuation of Ser. No. 204,743, Mar. 1, 1994, abandoned, which is a continuation-in-part of Ser. No. 177,250, Jan. 4, 1994, abandoned.

[51] Int. Cl.[6] .................................................. G06F 9/00
[52] U.S. Cl. ............................................................ 395/392
[58] Field of Search ................................................ 395/392

[56] References Cited

U.S. PATENT DOCUMENTS

| | | | |
|---|---|---|---|
| 4,698,747 | 10/1987 | Thompson et al. | 395/800 |
| 4,847,748 | 7/1989 | Yamahata et al. | 364/200 |
| 4,891,753 | 1/1990 | Budde et al. | 364/200 |
| 5,226,126 | 7/1993 | McFarland et al. | 395/375 |
| 5,317,720 | 5/1994 | Stamm et al. | 395/425 |

OTHER PUBLICATIONS

Lightner et al., The Metaflow Lightning Chipset*, Jan., 1991, pp. 13–18.

Hwang et al., New Hardware Scheme Supporting Precise Exception Handling for Out–of–Order Execution, 1993, pp. 16,17.

Johnson, Mike; *Superscalar Microprocessor Design*; Prentice Hall, Inc., New Jersey, 1991.

Johnson, Mike, "Superscalar Microprocessor Design", Englewood Cliffs, N.J.,: Prentice–Hall, 1991.

Popescu, Val; Schultz, Merle; Spracklen, John; Gibson, Gary; Lightner; Bruce; Isaman, David, "The Metaflow Architecture", IEEE Micro, Jun. 1991, pp. 10–13 and 63–73.

*Primary Examiner*—Krisna Lim
*Attorney, Agent, or Firm*—Blakely, Sokoloff, Taylor & Zafman

[57] ABSTRACT

A method and apparatus for performing store operations that includes calculating the address and obtaining the data for the store operation. The address represents the memory location to which the data is to be stored. Once the address is calculated and the data obtained, the store operation is committed to processor state. The store operation may be dispatched to memory to complete the execution of the store operation.

49 Claims, 16 Drawing Sheets

| UNIT | 40 | 41 | | 42 | | 43 | | 44 |
|---|---|---|---|---|---|---|---|---|
| | Low | High | Low | High | Low | High | Low | High |
| MOB/SAB | Internal Tail Update | SAB Array Read | MOB Dispatch to Data Cache, Cancel if Bank Conflict | | Block Store Due to Conflict with Another Store | | SAB Array Deallocation | External Tail Update |
| DATA CACHE MEMORY | | Data Cache Stall Assertion | Receive Dispatch | Read Physical Address | Block Store Due to Access Already to Same Place Pending | Write Data into Array | | |
| MTU/SDB | | | Receive SBID from SAB | Read Store Data | Store Data to Data Cache | | | |

FIGURE 13

METHOD AND APPARATUS FOR EXECUTING AND DISPATCHING STORE OPERATIONS IN A COMPUTER SYSTEM

This application is a continuation of application Ser. No. 08/204,743, filed Mar. 1, 1994, now abandoned, which is a continuation-in-part of U.S. patent application Ser. No. 08/177,250 entitled "Method and Apparatus for Performing a Store Operation," filed Jan. 4, 1994, abandoned, and assigned to the corporate assignee of the present invention.

FIELD OF THE INVENTION

The present invention relates to the field of computer systems; more particularly, the present invention relates to performing store instructions.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, disk drive, analog-to-digital converter, etc., is used to input instructions and data to the computer system via an I/O unit. These instructions and data can be stored in memory. The CPU retrieves the data stored in the memory and processes the data as directed by a set of instructions. The results can be stored back into memory or outputted via an I/O unit to an output device such as a printer, cathode-ray-tube (CRT) display, digital-to-analog converter, etc.

Data is stored back into memory as a result of the computer system performing a store operation. In the prior art, a store operation included an address calculation and a data calculation. The address calculation generated the address in memory at which the data is going to be stored. The data calculation produces the data that is going to be stored at the address generated in the address calculation portion of the store operation. These two calculations are performed by different hardware in the computer system and require different resources. In the prior art, the store operation is performed in response to one instruction, or one part of an instruction, wherein the data calculation is performed first and, once complete, the address calculation occurs as the operation goes to memory for execution.

When a store operation is dispatched to memory, the processor must allocate time to dispatch the store as soon as the store is ready to be dispatched. Therefore, the store operation demands immediate attention from the processor that might be directed to other operations or functions. However, often there is no other immediate requirement that the store be completed. Thus, it is desirable to allow store operations to be dispatched separately from the processor and the remaining operations its performing.

The present invention provides for performing of store operations such that the store operations are designated to memory and committed to system state. In this manner, the store operations are dispatched at the convenience of the memory system.

SUMMARY OF THE INVENTION

A method and apparatus for performing store operations is described. The present invention includes a method and apparatus for calculating the address and obtaining the data for the store operation. The address represents the memory location to which the data is to be stored. Once the address is calculated and the data obtained, the present invention provides a method and apparatus for committing the store operation to processor state. The present invention also includes a method and apparatus for dispatching the store operation to memory.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 13 is a pipeline diagram describing the pipestages associated with one implementation of the memory pipeline of the present invention.

DETAILED DESCRIPTION OF THE PRESENT INVENTION

Figure 1:
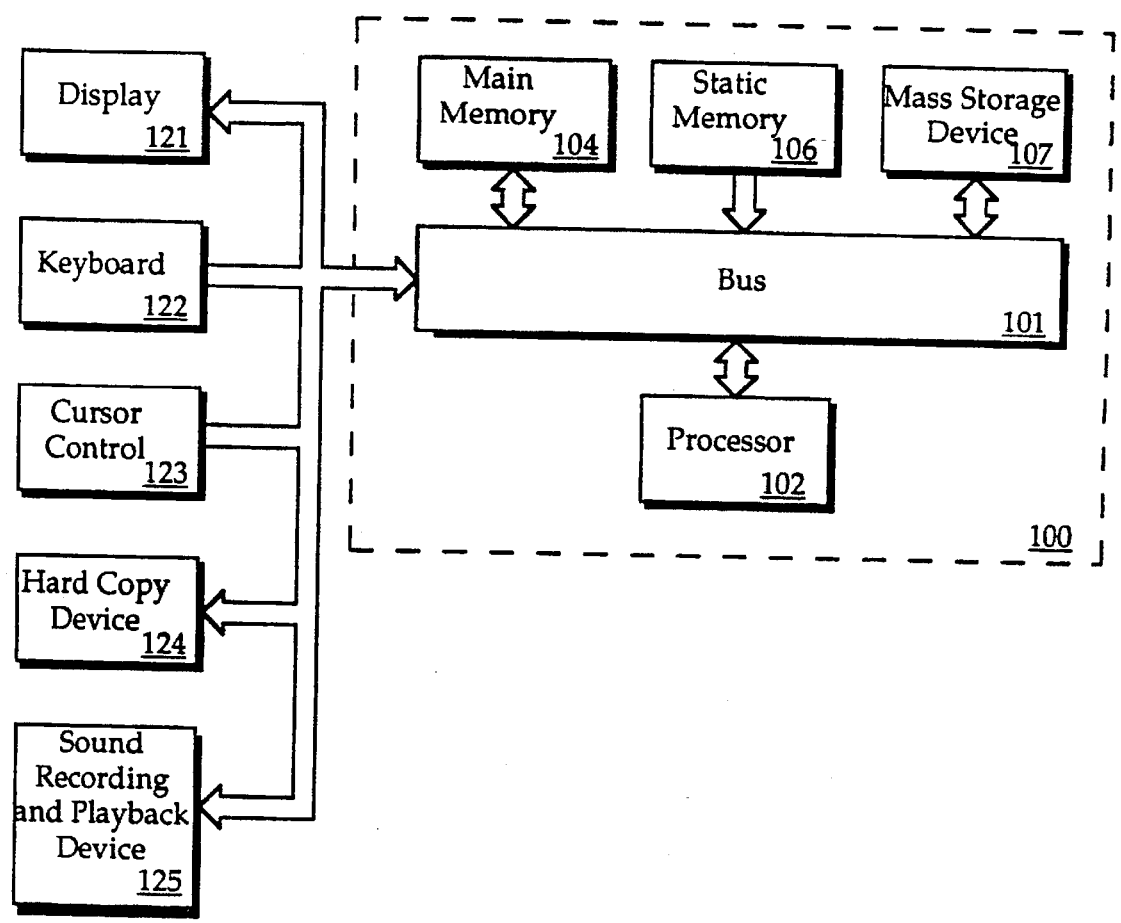
FIG. 1 is a block diagram of the computer system of the present invention.

A method and apparatus for performing store operations in a computer system is described. In the following detailed description of the present invention numerous specific details are set forth, such as specific buffer names, identification numbers, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

Overview of the Present Invention

The present invention provides a method and apparatus for performing a store operation in a computer system. The store operation is received by a processor in the computer system. The processor upon receiving the store operation produces two micro-operations, referred to as the store data (STD) and the store address (STA) operations. These micro-operations correspond to the data calculation and address calculation sub-operations of the store operation respectively. The processor then executes the STD and STA operations separately. Upon completion of the execution of the STD and STA operations, their results are combined and ready for execution to a cache memory or main memory.

The present invention uses a managing buffer that oversees the execution of the store data (STD) and store address (STA) operations. The managing buffer of the present invention indicates when the data is available and the address has been generated to complete the store operation to the memory device (e.g., cache, main memory). Once the managing buffer has determined that the data is available and that the address has been calculated, the managing buffer causes the data and the address to be sent to memory for completion.

In the present invention, a store operation may be dispatched to memory whenever the memory subsystem desires. However, the managing buffer is able to retain a store operation while the store operation waits for dispatch. Dispatch may occur once the data has been obtained and the address calculated or after the data has been obtained and the store operation is to be committed to processor state, or retired. By allowing the store operations to complete to memory at their convenience, the present invention is able to decouple their subsequent execution from the remainder of the processor once the processor has furnished the address and the data for the store.

By generating the address independently from the data for the store operations, the present invention is able to determine which of the subsequently issued load operations may have an address conflict or other dependency that would require the execution of a load operation to be stopped until the conflict is resolved. Moreover, by determining the address early, those load operations without conflicts or dependencies may continue without being halted, such that the memory subsystem of the present invention is non-blocking.

Overview of the Computer System of the Present Invention

Referring to FIG. 1, the computer system upon which a preferred embodiment of the present invention is implemented is shown as 100. Computer system 100 comprises a bus or other communication means 101 for communicating information, and a processor 102 coupled with bus 101 for processing information. Processor 102 includes, but is not limited to microprocessors such as the Intel™ Architecture Microprocessors, manufactured by Intel Corporation of Santa Clara, Calif., the corporate assignee of the present invention, PowerPC™, Alpha™, etc. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Furthermore, a sound recording and playback device, such as a speaker and microphone may optionally be coupled to bus 101 for interfacing with computer system 100. Note that any or all of the components of system 100 and associated hardware may be used in a preferred embodiment, however, it can be appreciated that any type of configuration of the system may be used for various purposes as the user requires.

Figure 2:
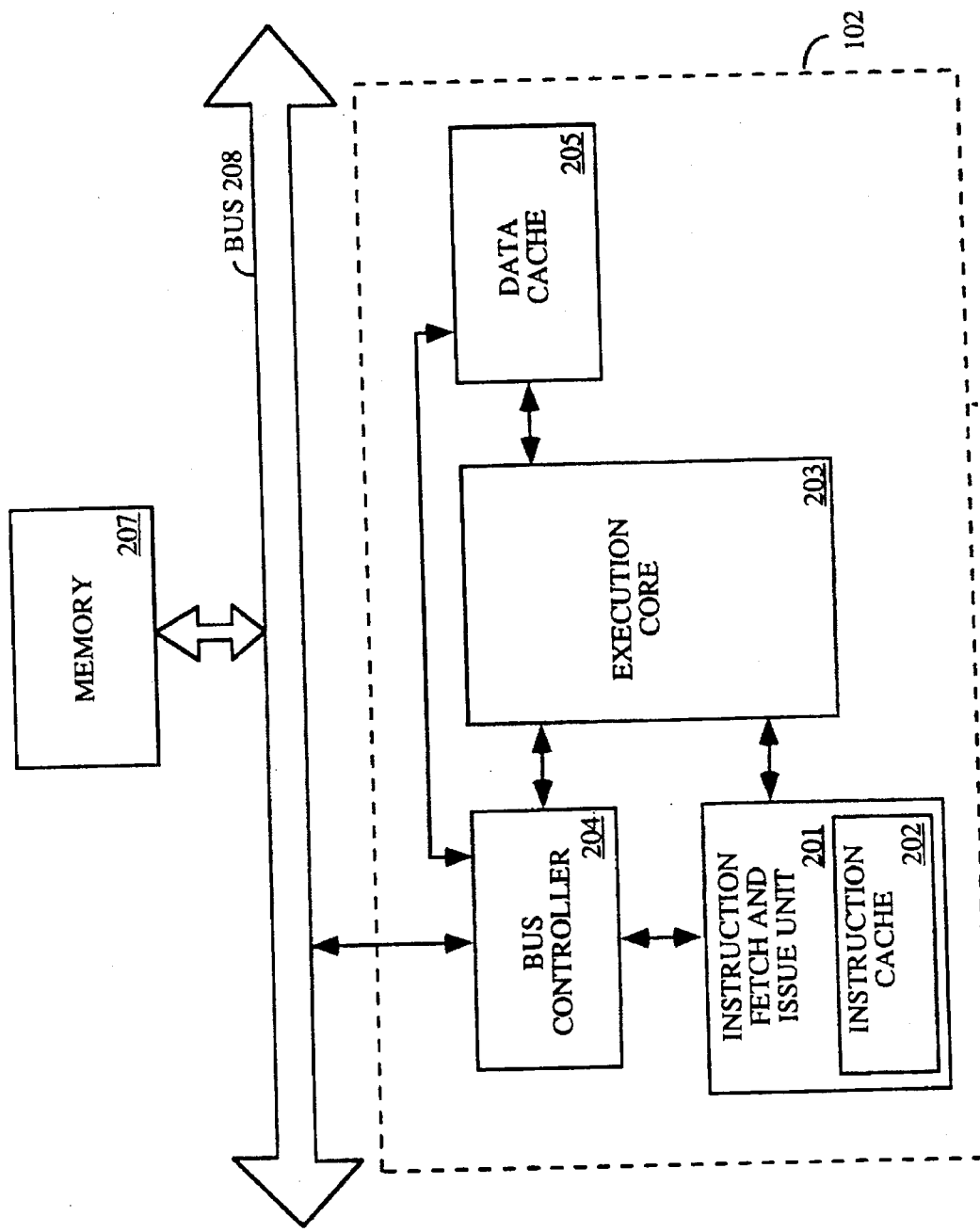
FIG. 2 is a block diagram of the memory subsystem of the present invention.

FIG. 2 is a block diagram of the memory subsystem of the computer system of the present invention. Referring to FIG. 2, the memory subsystem comprises an instruction fetch and issue unit 201 with an integrated instruction cache 202, an execution core 203, a bus controller 204, a data cache controller 205, a data cache memory 206, a memory unit 207, and a bus 208.

The memory unit 207 is coupled to the system bus. The bus controller 204 is coupled to the bus 208. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. In the present invention, the instruction fetch and issue unit 201, the execution unit 203, the bus controller 204 and the data cache memory 205 together comprise the processor 102 (FIG. 1). In the present invention, elements 201–205 cooperate to fetch, issue, execute and save the execution results of instructions in a pipelined manner.

The instruction fetch and issue unit 201 fetches instructions from an external memory, such as memory unit 207, through the bus controller 204 via bus 208, or any other external bus. The bus controller 204 manages transfers of data between external components and the processor 102. In addition, bus controller 204 manages cache coherency transfers. The fetched instructions are stored in instruction cache memory 202. The instruction fetch and issue unit 201 issues these instructions in order to the execution core 203. The execution core 203 performs such functions as add, subtract, logical AND, and integer multiply, as well as memory operations. Some instructions are fetch and issued speculatively.

The execution core 203 includes an execution unit that holds and executes the integer and floating point instructions when their operand dependencies on execution results of preceding instructions are resolved, including those integer and floating point instructions that are speculatively fetched and issued. Similarly, the execution unit 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 205 responds to the load instructions immediately, forwarding data if necessary, whereas the store instructions are buffered. Instructions are not necessarily executed/forward in the order they were issued, and some instructions are speculatively executed/forwarded. However, the execution results of the integer, floating point and load instructions are buffered, and then committed to a processor state in program order. The buffered store instructions are committed to processor state in program order and then executed in the "background", at the convenience of the memory system. Speculative integer, floating point and load execution results and buffered stores of mis-predicted branches are purged. Note that the speculative nature of fetched, issued and executed instructions is attributed to the uncertainty of whether a particular instruction or set of instructions is to be executed due to an unaffirmed branch prediction.

Instruction fetch and issue unit 201 is intended to represent a broad category of instruction fetching and issuing elements found in many computer systems. Their constitutions and functions are well-known and will be described only as necessary with reference to later figures, The bus controller 204, the bus 208, and the memory 207 are also intended to represent a broad category of these elements found in most computer systems. Their functions and constitutions are well-known and will be described only as necessary with reference to later figures. The execution unit 203, incorporating with the teachings of the present invention, and the data cache memory 205 will be described further in detail below with additional references to the remaining figures.

Figure 3:
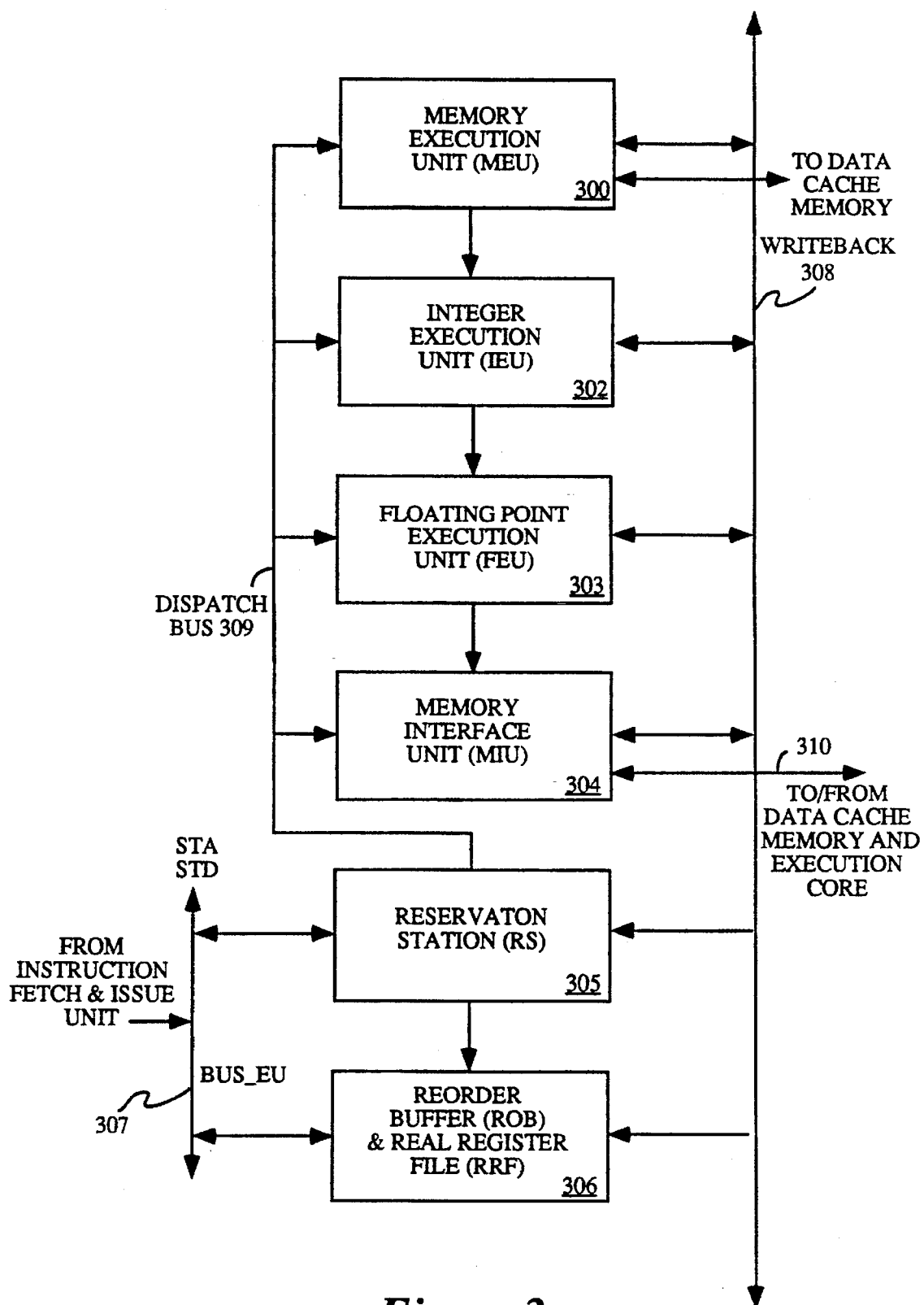
FIG. 3 is a block diagram of one embodiment of the execution unit of the present invention.

FIG. 3 is a block diagram of one embodiment of the execution core of the present invention. Referring to FIG. 3, execution core 203 comprises a reservation station (RS) 305, a memory execution unit (MEU) 300, an integer execution unit (IEU) 302, a floating point execution unit (FEU) 303, a memory interface unit (MIU) 304, a reorder buffer (ROB) and real register file (RRF) 306. Additionally, execution 203 includes an internal bus (Bus_EU) 307 and a writeback bus 308. MEU 300, AGU 301, IEU 302, FEU 303 and MIU 304 are all coupled to reservation station 305 via a dispatch bus 309. They are also coupled to writeback bus 308. MIU 304 is also coupled to the data cache memory and the MEU 300 via bus 310. RS 305 is coupled to ROB and RRF 306. ROB and RRF 306 is also coupled to the Bus_EU 307 and the writeback bus 308. Together, elements 301–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station (RS) 305 receives and stores the issued instructions resolving their operands with data from the IEU 302, the FEU 303, the data cache memory, and the ROB and RRF 306 and holds them until their operands are all resolved. The RS 305 then dispatches the issued instructions to the IEU 302, the FEU 303 and the MIU 304 and the MEU 300 (including its AGU) as appropriate.

In particular, a load instruction is dispatched as a single operation, whereas a store instruction is dispatched as store address (STA) and stored data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

In response to the dispatched operations, the MEU 300, the IEU 302, FEU 303 and the MIU 304 perform their operations accordingly. The execution results of the integer, floating point and load instructions are held in the ROB 306, and then committed by RRF 306 in the order these instructions were issued. Speculative execution results of the mispredicted branches are not committed, but instead are held in the ROB 306 and purged upon their detection.

Figure 5:
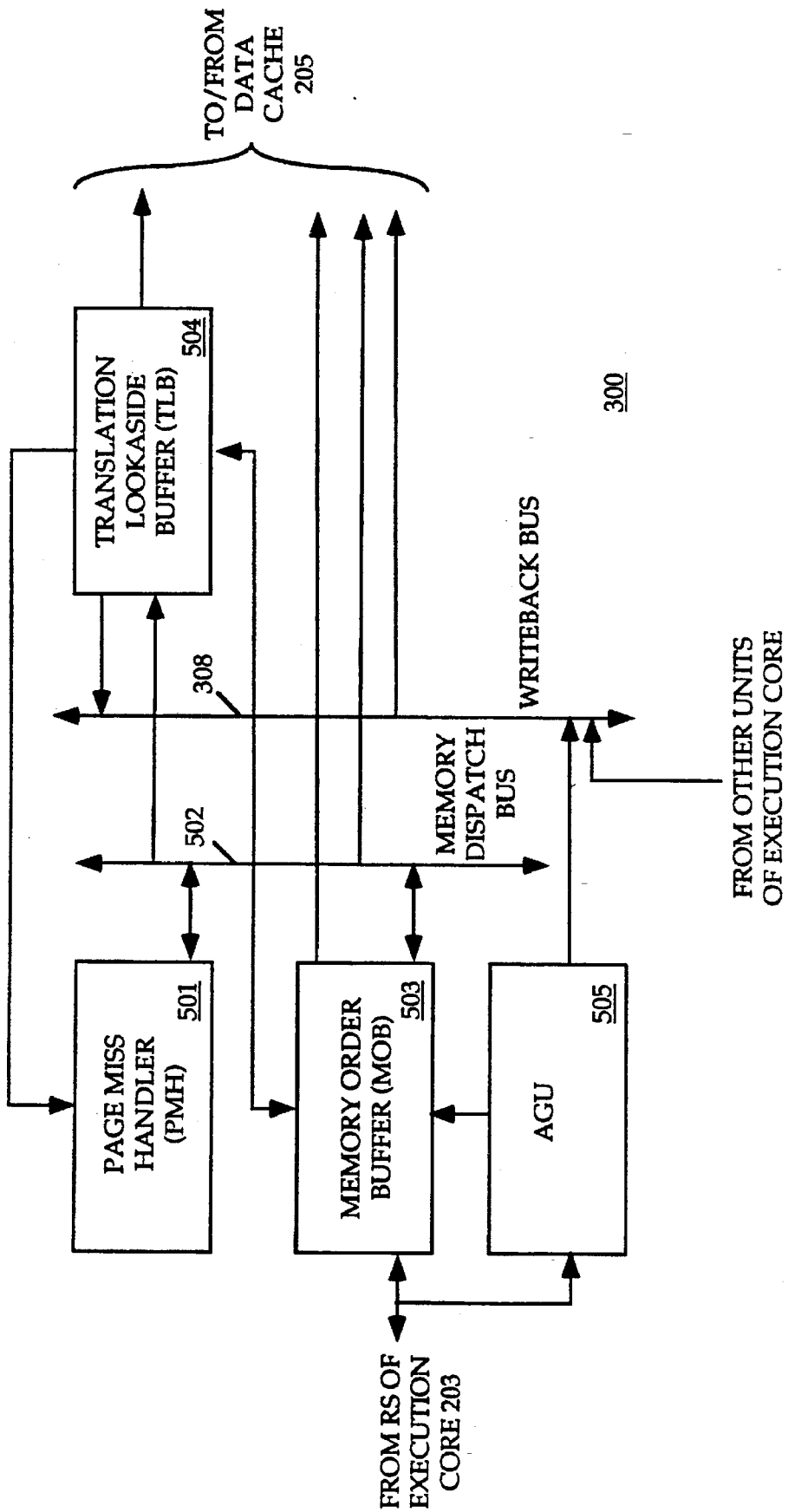
FIG. 5 is a block diagram of the relevant portions of the cache controller of the present invention.

FIG. 5 depicts a block diagram of the relevant portions of one embodiment of the memory execution unit (MEU) of the present invention. Referring to FIG. 5, the MEU 300 includes AGU 505, page miss handler 501, memory order buffer (MOB) 503, and translation lookaside buffer (TLB) 504, as well as memory dispatch bus 502 and the writeback bus 308, and TLB 504. MOB 503 is coupled to the reservation station 305, memory dispatch bus 502, writeback bus 308, the data cache memory 205 and TLB 504. TLB 504 is also coupled to memory dispatch bus 502, writeback bus 308 and the data cache memory 205. Memory dispatch bus 502 and writeback bus 306 are also coupled to the data cache memory 205. AGU 505 is coupled to MOB 503, the writeback bus 308, and the dispatch bus 309.

The AGU 505, MOB 503, PMH 501 and TLB 504 control all load accesses to the data cache memory and, in turn, the memory unit of the computer system. The AGU 505, MOB 503, PMH 501 and TLB 504 also execute the STA portion of the store. Specifically, MOB 503 buffers the results of the STA execution for the eventual store dispatch to the data cache memory 205.

Figure 4:
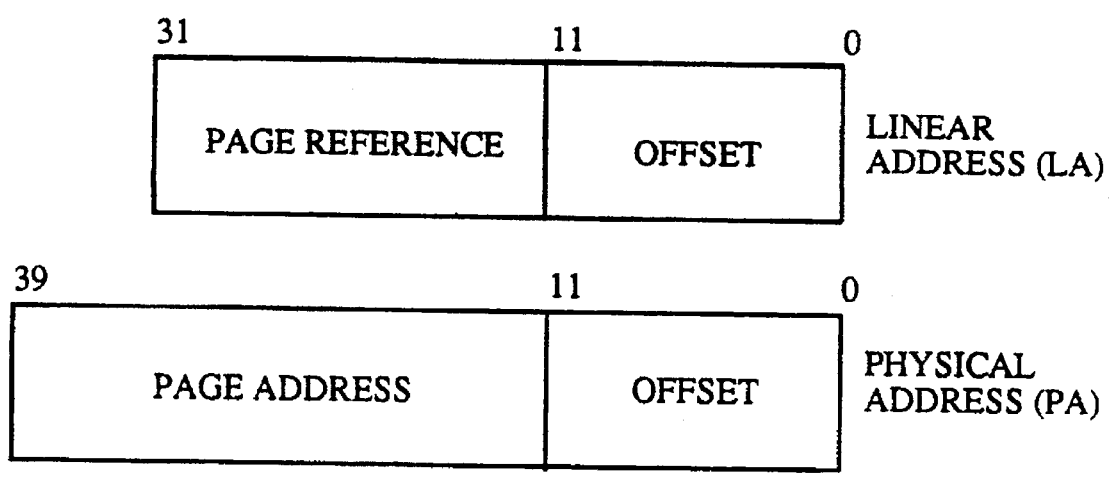
FIG. 4 illustrates an example of one embodiment of the addressing scheme of the present invention.

The AGU 505 generates the appropriate linear address for the memory operations. The AGU 505 computes the linear address using a base address, a displacement value, a scale value, and index value and a segment value. In one embodiment, the linear address is 32-bits long with a 20 higher order bits identifying the offset within the memory page. An example of such an addressing scheme is shown in FIG. 4. In one embodiment, the present invention may include multiple AGUs, such as two, three, etc.

TLB 504 translates the 32-bit linear address into a 36-bit physical address with 24 higher order bits indicating the memory page, as shown in FIG. 4, and forwards misses to PMH 501. In response, PMH 501 performs page walking and other well-known page miss handling functions.

The MOB 503, incorporated with the teachings of the present invention, controls dispatching, buffers all store and load operations, tracks their progress as they proceed through execution, and then retires/commits then to permanent architectural state as appropriate. MOB 503 then causes the retired/committed stores to be executed in due course "background" at the convenience of the memory system.

Additionally, MOB 503 responds to load operations forwarding buffered data as necessary. When an operation is dispatched and cannot complete due to some address or resource conflict, MOB 503 blocks the operation and stores the dependency information. MOB 503 redispatches blocked operations when the blocking source is removed. Some memory operations cannot execute speculatively, MOB 503 controls the necessary monitoring and dispatches these non-speculative operations at the correct time when they are no longer considered speculative. For instance, MOB 503 snoops the source addresses of instructions fetched and generates a stall signal(s) for the bus controller to stall an instruction fetch whenever the source address instruction being fetched substantially matches any of the store addresses of the store destinations of the buffered stored instructions.

The TLB 504 and the PMH 501 are intended to represent a broad category of these elements found in most computer systems. MOB 503 will be described in further detail below with additional references to the remaining figures.

Figure 6:
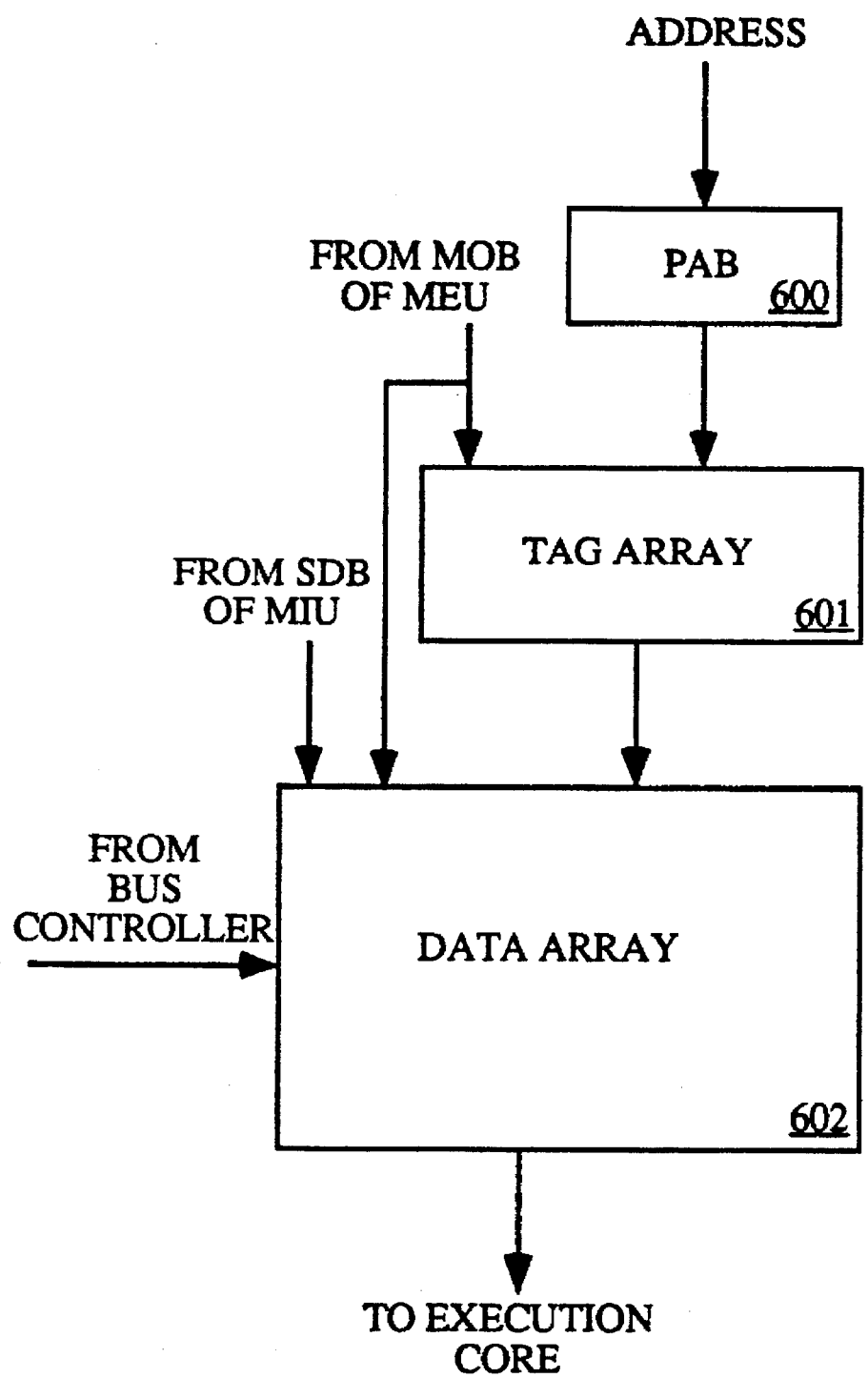
FIG. 6 is a block diagram of the relevant portions of the data cache of the present invention.

FIG. 6 is a block diagram of one embodiment of the data cache memory of the present invention. Referring to FIG. 6, the data cache memory 205 comprises a physical address buffer (PAB) 600, data tag array 601 and a data array 602. PAB 600 is coupled to receive an input from the TLB 504 of the MEU 300. Tag array 601 is coupled to receive an input from the store address buffer (SAB) of the MOB 503 (described later). Data array 602 is coupled to receive inputs from tag array 601, the store data buffer (SDB) of the MIU 304, the MOB 503 of the MEU 300 and from the bus controller. In response, data array 602 produces an output to the execution core.

The PAB 600 receives and saves the 28 high order bits of the translated physical addresses from the TLB 504 of the MEU 300 for the store operations, and in cooperation with the MOB 503 of the MEU 300 and MIU 304, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. In one embodiment, data tag array 601 and data array 602 have sufficient capacity for storing 128 sets of 2-way set associative 32-byte cache lines of data and their corresponding address tags. PAB 600, in its cooperation with the MOB 503 of the MEU 300, will be discussed in further detail below. Tag array 601 and data array 602 are intended to represent a broad category of these elements found in most computer systems, whose functions and constitutions are well-known and will not be further described.

Figure 7:
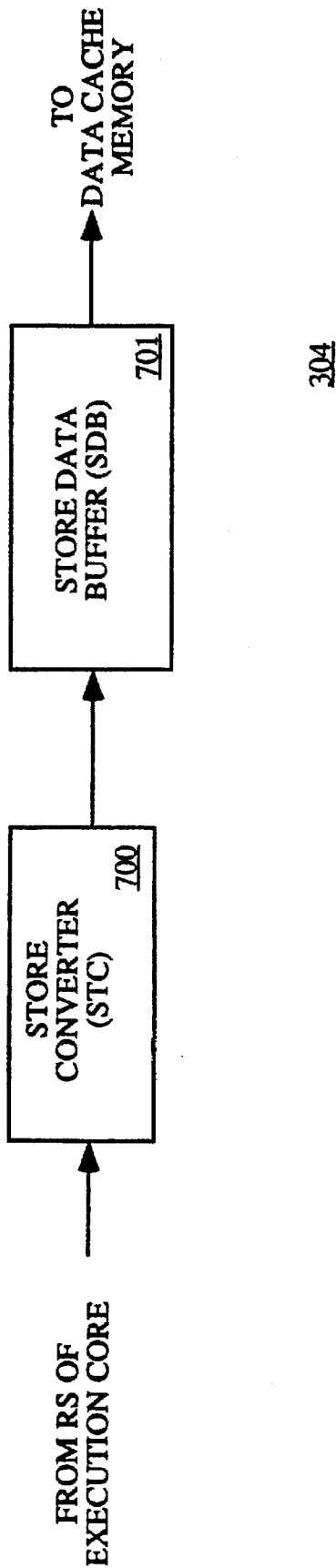
FIG. 7 is a block diagram of the relevant portions of memory interface unit of the present invention.

FIG. 7 is a block diagram of one embodiment of the relevant portions of the MIU of the execution core of the present invention. Referring to FIG. 7, the MIU 304 comprises a store converter (STC) 700 and a store data buffer (SDB) 701, coupled to each other, such that store converter 700 receives data from the reservation station 305 of the execution core 203 and sends data to SDB 701. SDB 701 then sends the data onto the data cache memory 205.

The STC 700 converts the floating point data of the STD operations. The SDB 701 receives and stores the STD operations and in cooperation with the store address buffer (SAB) of the MEU 300, and the PAB 600 of the data cache memory 205, retires/commits the STD operations as appropriate, and causes them to be dispatched (with their corresponding STA operations) to memory. In one embodiment, the SDB 701 includes 12 entries, each for storing a single STD operation. In one embodiment, each entry is capable of storing 64 bits of data. Each entry in the SDB 701 corresponds to an entry in the SAB and the PAB 600. That is, there is a one-to-one correspondence between the entries. The STA and the STD operations are assigned entries when issued. The assignment is in the form of an ID, referred to as the store buffer ID (SBID). The functions and constitutions of the STC 700 are well-known and will not be further described. SDB 701 and its cooperation with the SAB and PAB 600, will be described in further detail below.

Figure 8:
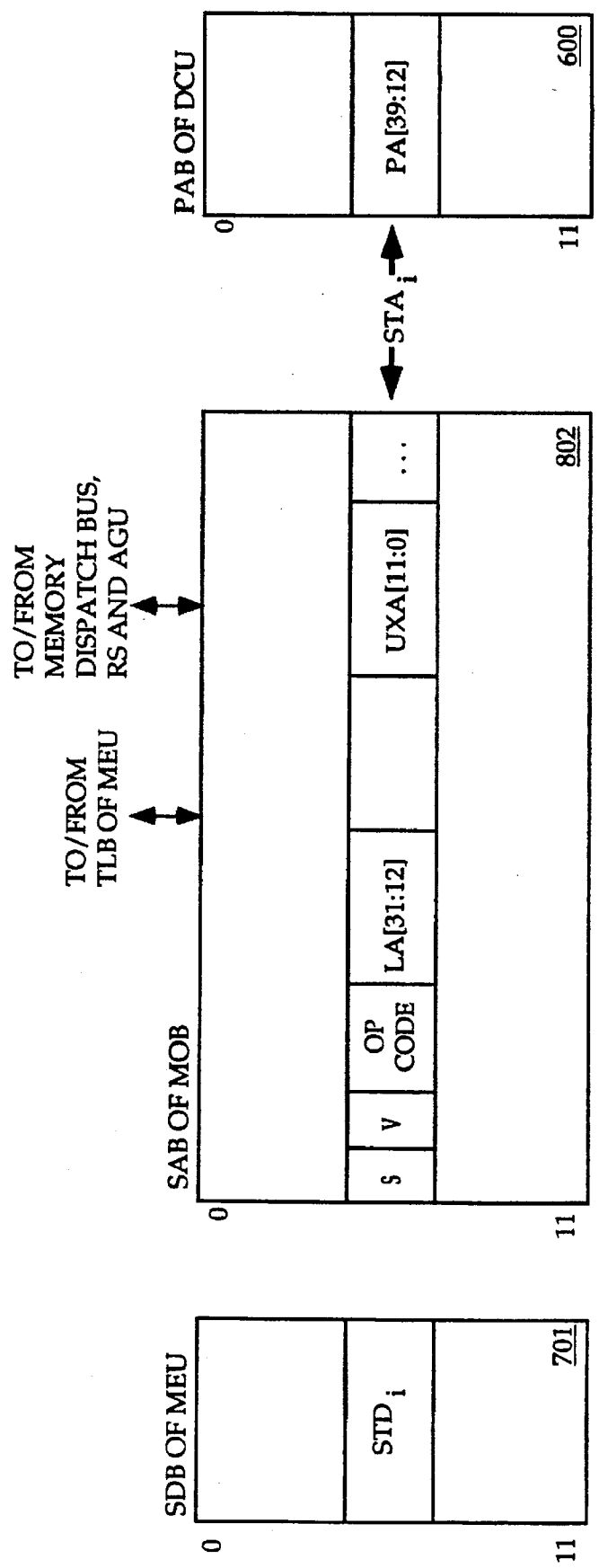
FIG. 8 is a block diagram of the relevant portions of the memory order system of the present invention.

FIG. 8 is a block diagram of one embodiment of the PAB 600, the SDB 701 and the SAB 802. Referring to FIG. 8, the SAB 802 is coupled to the TLB of the MEU 300 and memory dispatch bus. The PAB 600, the SDB 701 and the SAB 802 all include an equal number of buffer slots. In one embodiment, up to a maximum of 12 buffer slots are included. The STD and the STA operations of the store instructions are stored in corresponding buffer slots of the PAB 600, SBD 701 and SAB 802. More specifically, the 28 high order bit of the physical address (PA [39:12]) are stored in a buffer slot in the PAB 600. The STD operation is stored in a corresponding buffer slot in the SDB 701. The STA operation, including the valid bit, the OP code, the 20 high order bits of the linear address (LA[31:12]), and the 12 page offset designating bits of the address (UXA[11:0]), is stored in a corresponding buffer slot in the SAB 802. The STD and the STA operations of most store operations are promoted to a retired and committed processor state, i.e. ready for retirement or commitment, in due course, when their respective preceding instructions have been retired/committed to processor state. The committed STD and STA operations are then dispatched to memory in the "background" in due course when the data cache memory is available, after which time they are purged from the SBD 701, the SAB 802 and the PAB 600. The STD and STA operations of some of the store instructions, such as those storing data to memory locations mapped to I/O devices are retired/committed, and purges from the SDB 701, the SAB 802 and the PAB 600, concurrent with their executions. In one embodiment, the linear addresses are driven from the SAB 802 to the TLB again, and the newly generated PA is directly provided to the tag array 601 of the data cache memory 205. Additionally, if a store instruction involves storing data to memory locations spanning two cache lines, the MEU 300 signals the data cache memory, and the STD and STA operations are driven to the data cache memory 205 twice, with the data size and the physical address being adjusted accordingly the second time.

Performing Store Operations in the Present Invention

Figure 9:
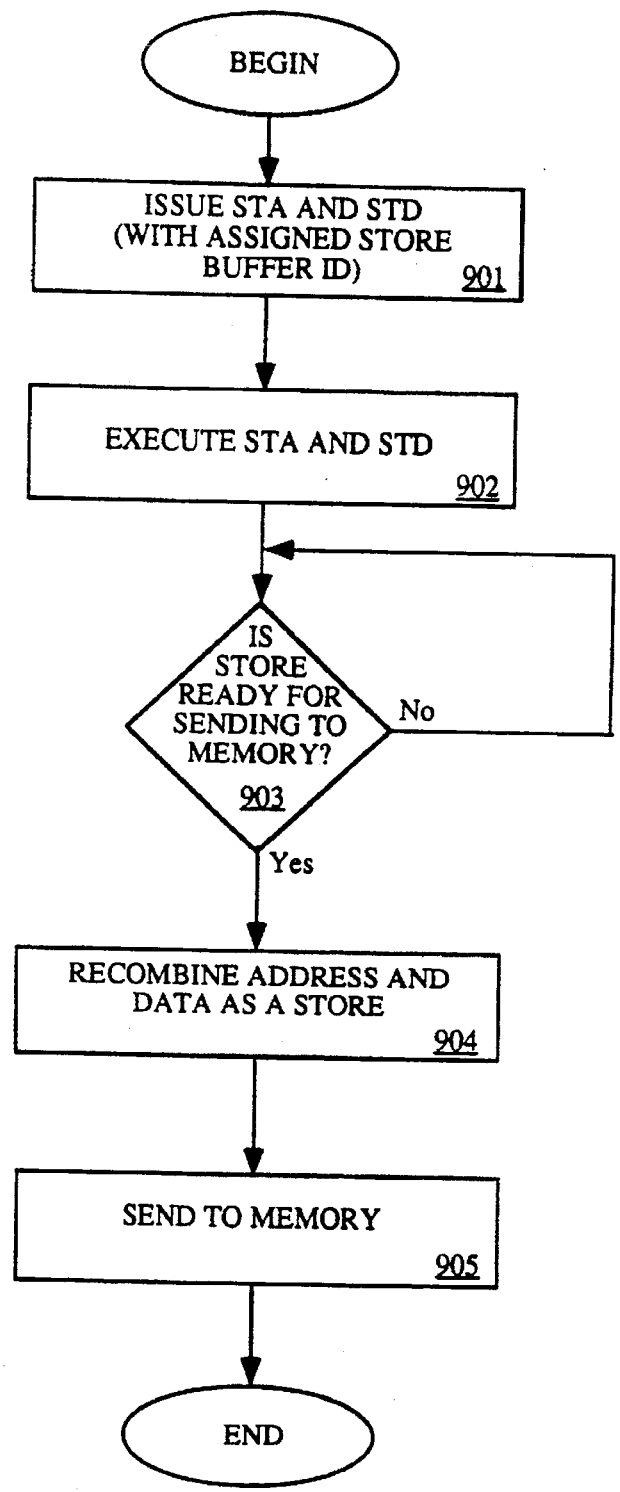
FIG. 9 is a block diagram depicting the interaction between the store address buffer the store data buffer and the physical address buffer.

The process for performing store operations in the present invention is shown in FIG. 9. In the present invention, each store operation is received and executed by a processor. The store operation is received as a store instruction. Referring to FIG. 9, in response to receiving a store instruction, a store data (STD) and store address (STA) instructions are issued (processing block 901). The STD and STA instructions are then executed independently and possibly in parallel, depending on the availability of resources (processing block 902). A determination is then made as to whether the store is ready to send to memory (processing block 903). Once it is determined that the store is ready to be sent to memory (e.g., ready to be committed to processor state), the address and data results from the execution of the STA and STD instructions respectively are recombined as a single store operation (processing block 904). Once the store has been recombined, the store is sent to memory for completion (processing block 905).

In the present invention, the processor receives a stream of instructions and initially generates a sequence of micro-instructions, including the STA and STD micro-instructions. The stream of instructions is usually received by the processor in response to an instruction fetch initiated by the processor. The micro-instructions are generated by a decoder in the instruction fetch and issue unit. The micro-instructions are issued in order as the processor reads the instruction. The STA and STD micro-instructions are then issued to the execution core of the processor for execution.

If the SDB, SAB and PAB are configured with multiple ports, then multiple STA/STD pairs may be executed at the same time in parallel in cooperation with the multiple buffer entries for the SDB, SAB and PAB. Furthermore, STA/STD pairs may execute out-of-order where there are not conflicts or dependencies between the store operations.

Figure 10:
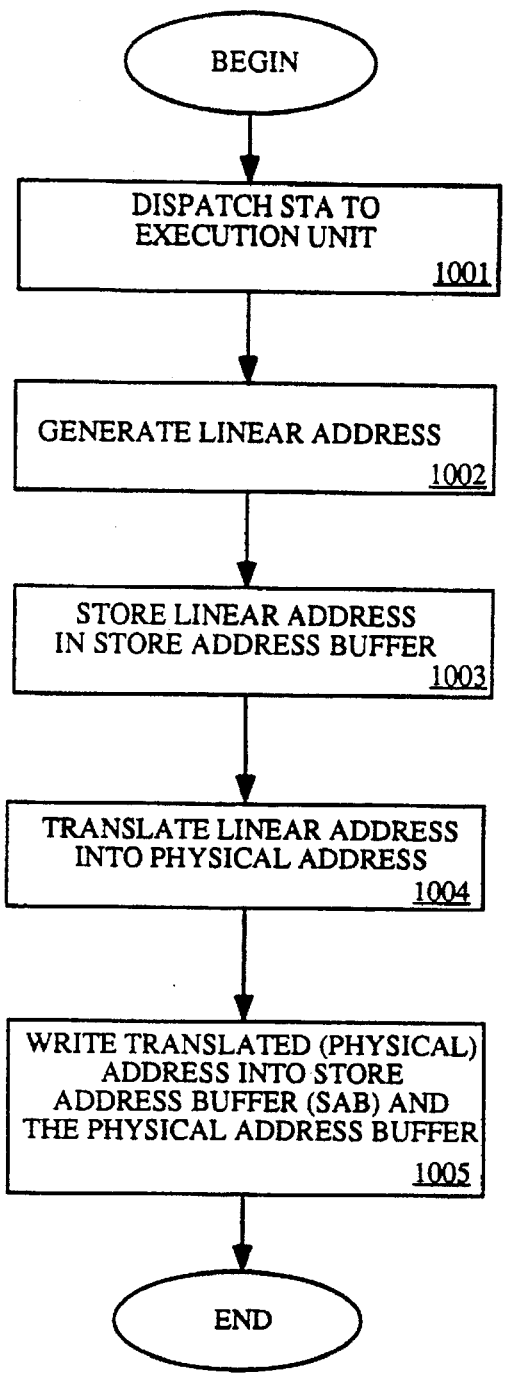
FIG. 10 is a flow chart depicting the process of the present invention for performing store operations.
Figure 11:
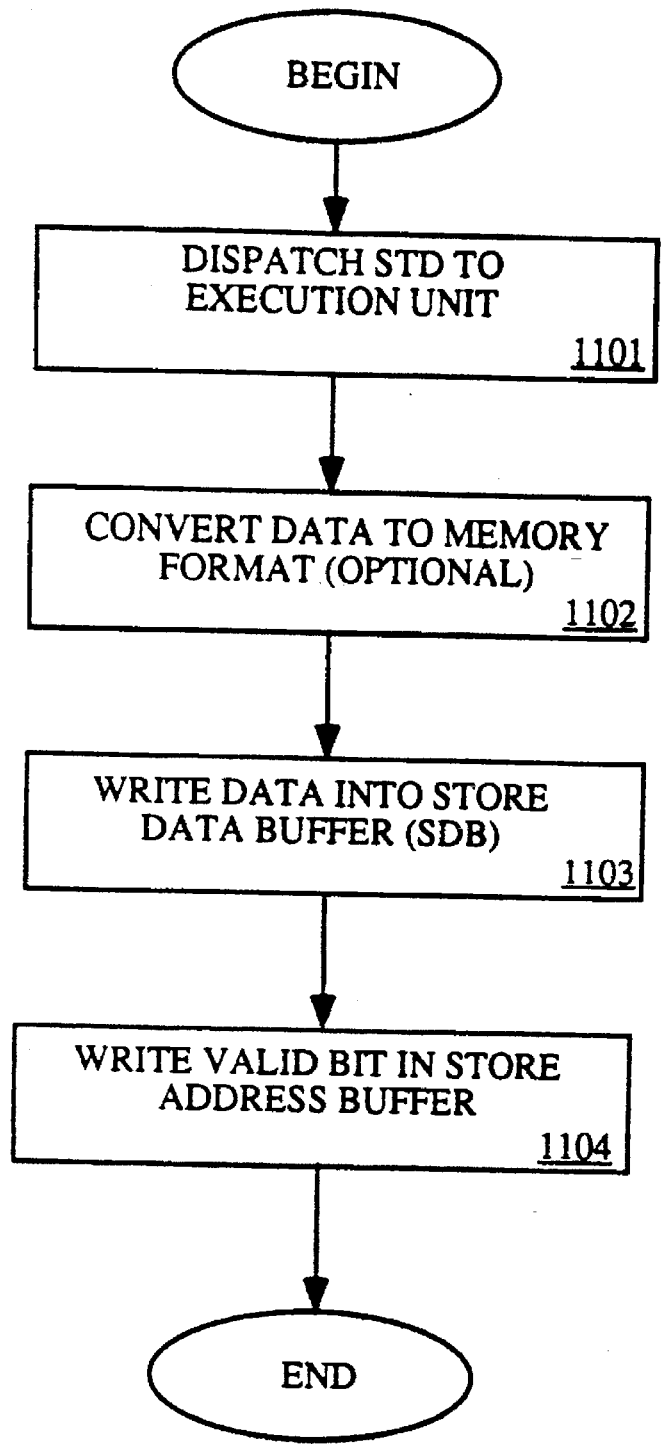
FIG. 11 is a flow chart depicting the execution process of a store address (STA) micro-operation.

FIGS. 10 and 11 are flow charts depicting the execution of the STA and STD micro-instructions respectively. The execution of instructions may be performed out-of-order, such that subsequently issued micro-instructions are executed before previously issued micro-instructions. The STA and STD instructions are scheduled for execution by the reservation station. The reservation station receives the STA and STD micro-instructions and determines when these micro-instructions, and any other received micro-instructions, may be sent to be executed. The determination of when a particular micro-instruction may be sent for execution is based on the availability of resources (e.g., AGUs, ALUs, etc.), as well as any true data dependencies that exist between the micro-instructions. The reservation station is responsible for initiating the out-of-order execution by scheduling the micro-instructions for execution out-of-order.

Referring to FIG. 10, the execution of a STA micro-instruction begins when it is dispatched to an execution unit (processing block 1001). The STA micro-instruction is dispatched by the reservation station to the AGU. Next, the linear address is generated by the AGU (processing block 1002). The STA micro-instruction includes the information necessary for the AGU to generate the linear address. In one embodiment, the AGU receives data in the form of a base address value, index value, displacement value, a scale value and a segment value which are added together to create the linear address. The AGU calculates the linear address in a manner well-known in the art.

Once the linear address has been calculated, it is stored in the store address buffer (SAB) (processing block 1003). A valid bit in the SAB may also be set, thereby indicating that the address is valid. In one embodiment, indicating that the address is valid occurs when the address is written into the SAB. The linear address is also sent to the TLB where the linear address is translated into a physical address (processing block 1004). The translation of the linear address into the physical address is accomplished in a manner well-known in the art. The translated (physical) address is stored in the SAB (processing block 1005), thereby completing its execution.

In one embodiment, the execution of the STA micro-instruction is performed in a pipelined manner. In the currently preferred embodiment, the dispatching of the STA micro-instruction occurs in a first cycle, followed by the linear address generation in the second, or next, cycle. In the second half of the second cycle, the linear address is stored in the SAB. In the third cycle, the linear address is translated by the TLB. In the second half of the fourth cycle, the translated (physical) address is written into the SAB.

Referring back to FIG. 11, the STD execution begins with the dispatch of the STD micro-instruction to the execution unit (processing block 1101). Once again, the STD micro-instruction is dispatched by the reservation station. It should be noted that the data to be stored as a result of the execution of the STD micro-instruction is data that is created or exists to some extent within the operating environment of the processor. Thus, the STD micro-instruction is dispatched when that data is ready to be stored. In other words, the STD micro-instruction is dispatched when the data to be stored has been created or is already present in the processor. The same relationship exists between the STA micro-instruction and the address of the store.

Once the STD micro-instruction has been dispatched, the data may be converted into a memory format (processing block 1102). In the present invention, this conversion occurs when the data is in a floating point format. In this case, the data is converted into an floating point format with less precision so that it may be stored in memory. If the data is already in integer format, then the data does not have to undergo conversion. In one embodiment, the data is converted by the store converter.

After the data is converted, (if necessary), then the data is written into the store data buffer (SDB) (processing block 1103) and the valid bit in the SDB is set (processing block 1104). If the data is integer data, it goes directly into the SDB.

In one embodiment, the STD micro-instruction is executed in a pipelined manner. In the currently preferred embodiment, the STD micro-instruction is dispatched in a first clock cycle. In the first half of the next cycle, any conversion of the data by the store converter occurs. In the second half of the second cycle, the data is written into the SDB and the valid bit in the SAB is written, thereby indicating that the data in the SDB is valid.

The MOB monitors the execution of the STD and STA micro-instructions and determines when their respective data and address calculations have completed, so that the store operation is ready for completion to memory. In the present invention, the MOB determines that the store operation is ready for completion by examining whether the address and data stored in the SAB and the SDB respectively are valid and whether the ROB has committed these operations to processor state. In one embodiment, the MOB makes this determination by examining the validity of the address and data stored in the SAB and SDB by examining the valid bits in the SAB. If the valid bit indicating that the address is valid and the valid bit indicating the SDB contains valid data corresponding to the address, then the MOB determines that the address and data information stored in the buffers is valid. The ROB indicates that the operations have been committed to processor state through the use of one or more signals sent to the MOB.

When the store is ready for dispatch to memory, the address and data are read out of their respective buffers, and the MOB dispatches them to the data cache memory. However, the MOB does not have to send the store to memory immediately upon determining that the address and data have been committed. In one embodiment, the store is sent by the MOB at the convenience of the memory system.

In one embodiment, both the SAB and the SDB have multiple entries for storing the address and data for multiple STA and STD operations, all of which might be at some stage of execution in the processor. There is a one-to-one correspondence between the entries in the SAB and the entries in the SDB. In order to maintain a correlation between a particular STA micro-instruction and its corresponding STD micro-instruction, each set of STA and STD micro-instructions is assigned an identification (ID), referred to as a store buffer ID (SBID). Each SBID corresponds to one entry in both the SAB and the SDB. Since there are twelve locations in each of the SAB and the SDB, each entry corresponds to one of twelve separate SBIDs.

A SBID is assigned to each set of STA and STD micro-instructions. This assignment occurs during the decoding of the store instruction, as part of the resource assignment. The STA and STD operations are tagged with the SBID. In the present invention, the instruction fetch and issue unit allocates the next available SBID. Since only twelve buffer locations exist, the instruction fetch and issue unit is able to enable a "wrap-around" effect by reallocating SBID from the top of the buffer (entry no. 1) after the SBID for the bottom (entry no. 12) has already been allocated.

Thus, once a SBID has been appended to the STA and STD micro-instructions, the micro-instructions are executed in two separate operations. A combining buffer (e.g., the SAB) monitors the execution of the STA and STD microinstructions and when the address and data are available, the store operation may be dispatched to the data cache memory by the MOB, in part, by indicating the specific entry in the SAB and SDB using the SBID. In one embodiment, this includes having the address output from the PAB.

The present invention identifies all operations that depend on a particular store operation. In one embodiment, all loads that are issued subsequent to a particular store operation are tagged with the SBID of the store operation. By tagging all of the loads, as well as the store, the MOB is able to maintain any dependencies between store operations and load operations. In other words, the MOB knows which store operations were issued before specific load instructions by examining the tags assigned to each of the operations.

The SBID may also be used to detect for address collisions between store operations and subsequently load operations. In the present invention, by precalculating the address or precalculating the data, some of the dependencies between load operations and store operations may be identified. In the present invention, the address of a store operation, through the STA micro-instruction may be calculated early so that a determination can be made as to whether subsequently issued load operations are to the same address. If they are, then they can be stalled until the store has completed execution. In this manner, the present invention ensures that a subsequent issued load operation loads the correct, or most recent, data.

In the present invention, the MOB determines if there is a collision by comparing addresses of store and load operations. If an address of a store and an address of a load collide, thereby indicating that there is an access to the same location, then the data is significant because the data can satisfy the load operation. If the addresses are different, the load operation is independent of the stores in the SAB, and does not need to be stalled. In the present invention, the MOB is able to cause the operation to be aborted by using signal(s) and buffer the operations until the conflict no longer exists. At that time, the MOB causes the operations to be redispatched.

Therefore, the present invention computes the address of stores early to try to manage possible dependencies between loads and stores, irrespective of the data that is involved. In the prior art, this determination requires several clocks, during which time the data is being calculated, before it is known whether there is a collision. The present invention reduces this delay and allows the resources executing the load operations to continue where there is no dependency. Because the present invention calculates the address early, a load operation seeking data from that address must wait, while those that do not want the data may continue. In this way, the processor of the present invention operates as a non-blocking engine.

The execution of the store operations in the present invention is performed to maintain memory ordering. Specifically, the portion of the execution of a store operation by the processor as well as its subsequent execution to memory are coordinated and performed in order to maintain processor consistency and maintain the performance of stores in program order.

Store Retirement and Dispatch

When the address has been calculated and the data obtained (e.g., when the STA and STD operations have been executed) or concurrently with the calculation of either or both, the store operations may be committed to system state.

After completion of the STA and STD operations and the obtaining of their results, the present invention is able to commit the store operation to processor state. The STA and STD operations are both retired. After being retired, the store operation is dispatched to memory. With certain store operations, dispatch occurs at retirement. The dispatching of stores to memory is performed in such a way as to ensure memory ordering.

Figure 12:
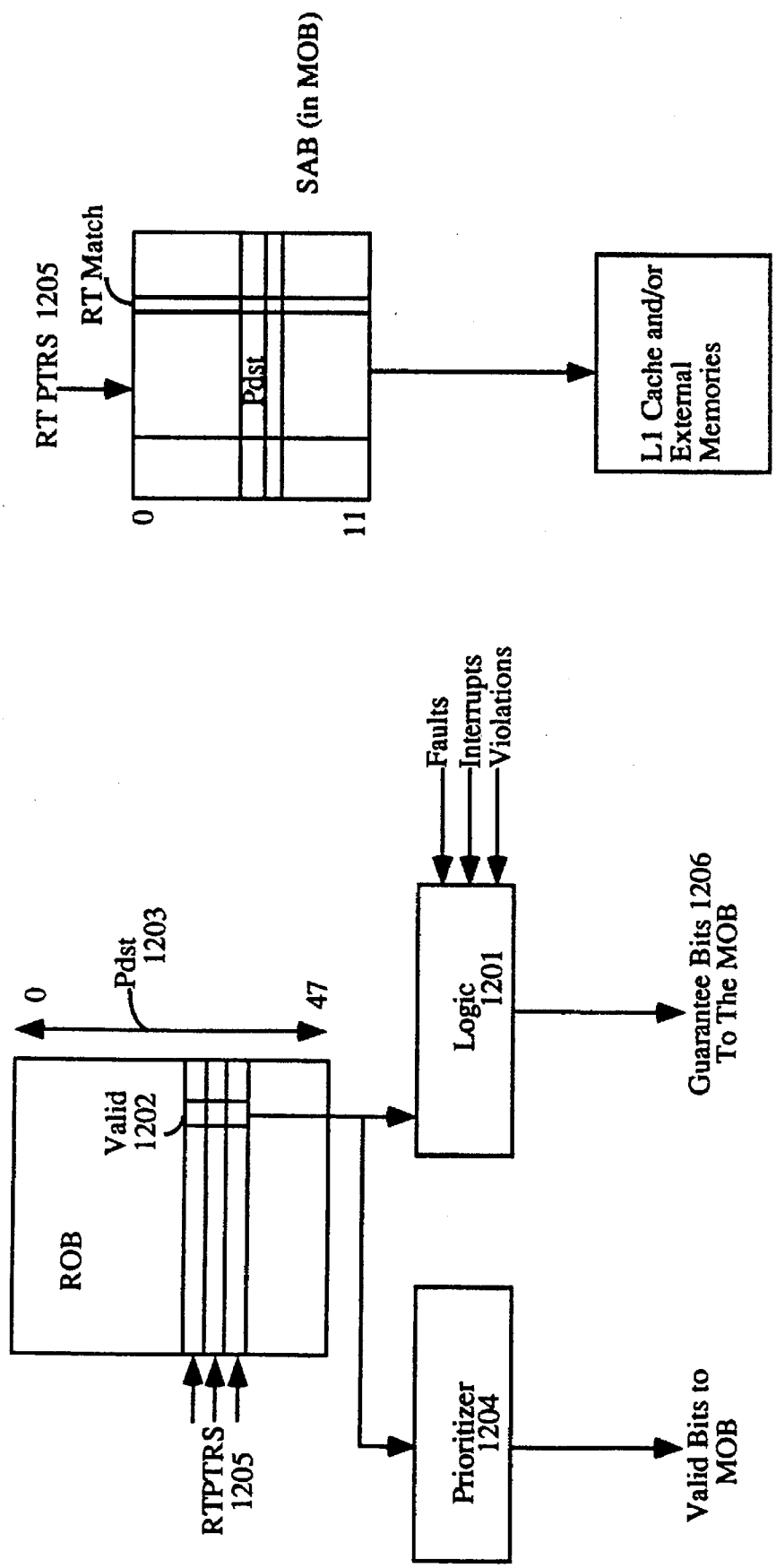
FIG. 12 is a block diagram of portions of the ROB and MOB used to maintain status of store operations in the processor of the present invention.

A store operation is retired by the MOB and the ROB and begins by detecting operations waiting on retirement. FIG. 12 illustrates portions of the ROB and MOB. The ROB manages all of the operations in the processor in one embodiment, the ROB manages the instructions by directly mapping each of the operations into a buffer and assigning an operation identifier or ID to each of the operations to identify the operations being executed by the processor. Each identifier is herein referred to as a Pdst. In one embodiment, the ROB includes forty-eight locations, numbered 0-47 for pending operation, where the number corresponds to the Pdst identifier for the location, shown in FIG. 12 as Pdst 1203. The entries are assigned sequentially 0 to 47 by the ROB. Each entry also includes a valid or finished indication (e.g., a bit location) to indicate that the processor has completed the operation. In one embodiment, a valid bit is included for each ROB entry, shown in FIG. 12 as valid bits 1202. Note that if the ROB has a limited number of entries (e.g., 48), it may be designed to act as a circular buffer. By acting as a circular buffer, operations stored in the ROB may be assigned to entries in the top of the ROB when the bottom of the buffer has been reached, and the ROB is able to know, through the use of pointers or other buffer management mechanism, that those operations placed in the entries at the top of the buffer are not older than those at the bottom. In this manner, the buffer is able to wraparound.

When the processor completes its part of the execution of an operation, the valid bit in the ROB for that operation is set to indicate that the operations (e.g., STA and STD micro-instructions) have been executed by the processor. In the case of a store operation, the ROB contains locations for both the STA and the STD operations. In one embodiment, these are assigned to sequential entries in the ROB. When the STA or STD operations are executed by the processor, yet before the STA and STD operations are combined into a single operation and dispatched to memory, these corresponding entries in the ROB are set to valid.

In some cases, the setting of the valid bit for either the STA or STD occurs when the store operation is dispatched to memory. In the preferred embodiment the STD operation is retired before dispatch and the valid bit for its corresponding STA operation is set when the store dispatches to memory.

As the processor continues execution, the ROB determines which of the next entries is to be retired. This identification is made through the use of retirement pointers, such as RT PTRS 1205. The ROB selects entries for retirement based on the length of time the operation has been listed in the ROB, selecting from oldest to youngest. In one embodiment, a particular entry may be retired if its valid bit is set, all operations that precede it in program order are retired (or selected for retirement) and there are no faults, interrupts or other violations that would prevent the operation from retiring. Logic 1201 associated with the ROB evaluates faults, interrupts and other types of violations to determine if any event occurred during the execution of the operation by the processor that would prevent the operation from being retired. Other logic 1204 prioritizes the retirement pointers.

Logic 1201 receives the valid (done) bits 1202 and the execution status indications (e.g., faults, interrupts, violations) and outputs guarantee bits 1206, each indicating that a particular entry in the ROB is to be retired. The guarantee bits 1206 are set according to the state of the valid bits and the fault, interrupt and other violation indications received from components in the processor. In one embodiment, the protocol of logic 1201 is such that the first guarantee bit is set if the first valid bit is set. The second guarantee bit can only be set if the first guarantee bit is set and the second valid bit is set. Finally, the third guarantee bit is set if the first and second guarantee bits are set and the third valid bit is set. Each of these cases assumes that there are no faults, interrupts or violations that would prevent retirement. Therefore, with the exception of the guarantee bit of the oldest operation, a guarantee bit is only set if its corresponding valid bit is set and the guarantee bits of any operation older than itself currently being examined are set. When the ROB asserts guarantee bits 1206 for a Pdst (a ROB entry), all other preceding operations retire and the Pdst commits to processor state. That is, the guarantee bits 1206 indicate that the operation is to retire.

In one embodiment, the ROB identifies the next three operations that are to be retired using retirement pointers 1205 that point at the next three entries. The results of the retirement process are a set of retirement pointers, a set of valid bits and a set of guarantee bits.

The retirement of a store operation by the MOB and the ROB is achieved by using retirement pointers and the guarantee bits. The MOB stores store operations and load operations in different states. Each entry in the store address buffer (SAB) of the present invention includes a portion of space for storing the Pdst used to reference the operation by the ROB. The MOB also stores valid bits to indicate completion of an operation. The present invention provides a retirement match between the Pdsts stored in the store address buffer and those of the retirement pointers to identify store operations for possible retirement. In one embodiment, a store operation designed for retirement is the oldest operation that hasn't been dispatched to memory for execution. Thus, the MOB matches all of the retiring Pdsts and valid bits and determines if a memory operation in the store address buffer is the oldest operation. Note that this is sufficient to begin execution at retirement since all other operations are valid and will either retire or fault. The guarantee bits 1206 signal if the valid retiring store operation is not aborted due to some type of fault, interrupt or other violation. It is the guarantee bits 1206 that indicate that the valid memory operation is now committed to processor state.

The MOB uses the retirement pointers to access the array through content address match (CAM) cells. A separate CAM match occurs for each of the RT PTRS 1205. These pointers 1205, matching on Pdsts in the array, identify the STA operations that are candidates for retirement. In this manner, the present invention includes multiple data structures and uses a pointer in one data structure and CAM matches to a data field in another data structure to represent the retirement of the operation. If a guarantee bit is set, associated a retirement pointer that matches an entry in the store buffer, then the store operation is promoted to senior state. That is, a senior status is written directly into the SAB array. In one embodiment, each entry in the SAB includes a bit indication to indicate if a store has transitioned to senior state (e.g., retired). When a store transitions to senior state, the entry is effectively committed to processor state. By processor state, the store is preserved regardless of any branch mis-predictions or faulting of the processor due to an error. In this manner, the present invention provides a mechanism to buffer store operations using a dynamic depth store buffer to hold multiple stores, such that the remainder of the processor is decoupled from the dispatch of stores to memory. This store buffer remains processor consistent but is not globally observed.

STA retirement does not imply immediate MOB dispatch of the store to the data cache memory. Guaranteed retirement of the STA implies that the ROB has received the writeback (WB) valid bit for the operation's execution and there are no faults on or before the STA. When an entry in the store address buffer is a valid entry, has a CAM match with a retirement pointer, and the retirement valid bit is set, the entry transitions to "senior" state and/or may be dispatched immediately to memory. As will be discussed, an operation is dispatched at retirement if there a retirement match (e.g., its first retirement match is a zero) and that entry is the oldest one in the buffer. Once retired, the ROB may deallocate and re-use the same Pdst for another operation issued by the issue and fetch unit after instruction decoding. In one embodiment, if the ROB entry is valid, retirement valid bit is set and a pointer match occurs, then the ROB entry may deallocate.

Senior Store Designation and Dispatch

The store buffer is a circular buffer that includes store operations ordered from oldest to youngest (with respect to their program order). The store buffer includes both speculative stores (unretired) and senior stores (retired). By allowing stores to transition to senior state, the present invention allows the processor to commit operations to a processor state, not system state, without actually dispatching the store operation to memory. Thus, the store buffer of the present invention provides for storing both speculative state and committed processor state.

The store buffer allows the dispatching of stores to memory to be decoupled from the processor's execution of the store. Due to speed differences between memories (e.g., cache memories) and the processor, the decoupling allows the two to operate at different speeds. Neither the processor or memory system needs to impact each other when store operations are to be performed. That is, neither incurs pipeline delays because the execution pipeline and the memory pipeline are decoupled.

Further, loads that are speculative may need data which is the subject of a store. The store buffer allows stores to be maintained after they are committed to processor state. In one embodiment, load operations may be satisfied out of the store buffer.

The store buffer contains two classes of entries: 1) senior stores associated with entries that are known to be committed, yet not dispatched to memory, and 2) speculative stores associated with entries that may or may not be eventually completed and committed to system state. The store buffer manages the current state of the stores contained therein using a retirement indication and a true commit indication. The retirement indication indicates stores that are retired, or known to be committed, yet not dispatched to memory for completion. The retirement indication may comprise a storage element (e.g., bit location) that may be set to indicate whether a store is retired or not. In the currently preferred embodiment, this storage element is referred to as a senior bit. The true commit indication indicates a store that has been retired and dispatched to memory. The true commit indication may be an indication as to whether the operation still requires dispatch to memory. Such an indication may be a bit location in the MOB that may be set. One benefit of such an approach is that pipeline delays are avoided. As is explained above, this is due to the decoupling of the execution of the store to memory from that of the execution of the store in the processor.

FIG. 13 illustrates one embodiment of a pipeline for dispatching a senior store. The MOB maintains an internal (tail) read pointer (e.g., the retirement pointer) used to access the next store operation in the MOB for dispatch to the data cache memory. If the operation has a senior bit set (i.e., it is a senior store), then the store dispatches if the data cache memory resources are available (e.g., the senior stores can dispatch when the data cache memory is not in a stall condition). The store pipeline follows the same cycles of STA dispatches, but the TLB and write-back resources are not needed, as the physical addresses are already in the PAB of the data cache memory.

During the first cycle, the MOB indicates a senior store dispatch by asserting one or more signals to signal the data cache memory dispatch. Also, during the first cycle, the MOB monitors the ports to the data cache memory to determine if there will be a data cache memory bank conflict. A conflict is detected when the store, split or not, writes to a data cache memory bank that a load will access. The bank is identified by bits 3 and 4 of the linear address. The SAB compares bits 3 and 4 of both the load and the store, and if equal, then a signal is asserted to indicate a senior store dispatch has invalidated.

During a dispatch, the SBID is sent to both the data cache memory PAB and the MIU's SDB to ready the address and data early in the second cycle. Assuming the data cache memory is not accessing the same location already, the data cache memory writes the store data into the data cache memory during the third cycle. The MOB completes the operation by deallocating the entry late in the third cycle, and updating an external (tail) pointer in clock 4, thereby indicating that the operation was accepted by the memory system (e.g., no squashes or blocks) and the entry may be deallocated. The external pointer signifies that the SAB entry in the MOB may be reallocated to another store by the issue and fetch unit.

Figure 14:
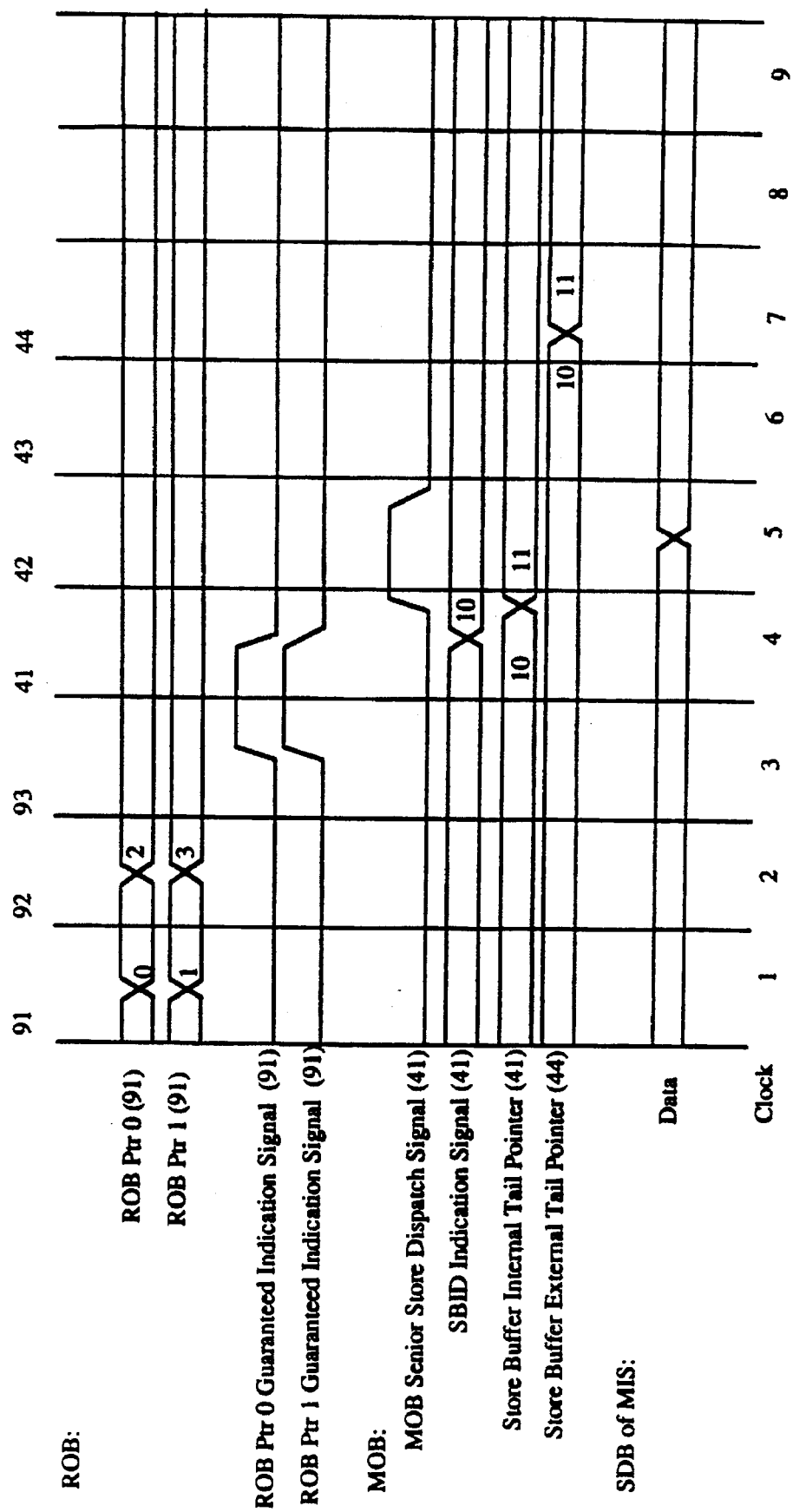
FIG. 14 is a timing diagram of the dispatching of a senior store according to one embodiment of the present invention.

FIG. 14 illustrates the timing diagram of one embodiment of the dispatch of a senior store. A store is promoted to senior state following retirement of the STD/STA pair identifying the store. Once this store is the oldest in the store buffer, it dispatches to the data cache memory at the earliest open cycle.

Referring to FIG. 14, a clock by clock description of one embodiment of the senior store dispatch protocol is shown. In clock 1, Pdst 0 and 1 are retired by the ROB. These represent a STD/STA pair. In clock 2, retirement pointers (e.g., ROB Ptr 0) are updated for retiring operations in the ROB, and retirement valid indications are asserted (e.g., ROB Ptr 0 Valid Indication Signal). In clock 3, operations 0 and 1 receive guarantee bits, and the store associated with Pdst 0 and 1 is promoted to senior state. In clock 4, the internal tail pointer reads the senior store (Pdst 1, SAB entry 10) into the SAB dispatch latch (not shown). The SBID of the entry is sent to the MIUs SDB and data cache memory PAB for sending the data and physical address to the data cache memory respectively. In clock 5, the SDB reads the data for the store according to the SBID and outputs the data to the data cache memory. Note that in clock 6, senior stores have no writeback, since they are already retired. The operation completes by deallocating the entry from the SAB. In clock 7, the external tail pointer is updated to reflect deallocation of the senior store.

STA/Store Dispatch at Retirement

Certain store operations in the preferred embodiment are dispatched at retirement. The stores that dispatch at retirement are those operations which have effectively stalled in the processor. This is usually indicated by an absence of valid bits being set in the ROB and may occur to force execution in program order to maintain compatibility and/or save hardware complexity. Since the processor has stalled, the store operation dispatched at retirement is the oldest in the processor (according to program order).

Store operations that are dispatched at retirement may dispatch and retire immediately. When dispatching and retiring immediately, as far as the processor is concerned, the operation completes when the memory (e.g., data (L1) cache memory) receives and gains control of the operation. On the other hand, store operations that are dispatched at retirement may dispatch and retire only after there has been an acknowledgment as to the completion of the operation. In the present invention, the external bus acknowledges the completion of the operation by performing a writeback to the ROB. This ensures that memory ordering is maintained. The ROB retirement signals the MOB that it can deallocate the entry. I/O operation are an example where the operation remains in the SAB until the external bus completes them. The MOB does this to maintain memory order requirements of the I/O system. In either case, the present invention maintains memory ordering.

In one embodiment, each store operation does not transition to senior before deallocation. When the store operation retires immediately, they can deallocate immediately. During a bus cycle, the entry in the store buffer is turned into a "no-operation." in one embodiment, the true commit indication bit is set to indicate that the operation does not have to be dispatched. The memory returns the valid data back to the ROB. In turn, the ROB produces valid bits and guarantee bits. A retirement match follows using the valid bits and guarantee bits, such that the entry turns to senior. Once senior, the entry dispatches and does nothing because it is a "no-operation." When the true commit indication is set, no dispatch occurs, thereby effectively producing no effect.

In one embodiment, when the MOB dispatches an operation at-retirement, the data cache memory store pipeline and store address pipeline operate together in parallel. Since the STA is not complete, the data cache memory uses the TLB translation information to determine the physical address and memory type, as opposed to the data cache memory using the physical address and SAB memory type. Likewise, the MOB and data cache memory operate together in determining if a STA operation blocks and to ensure that the store portion of the access does not commit to state. The data cache memory, likewise, uses the TLB translation status to determine if the operation has failed. If the TLB asserts a page miss, TLB block or TLB fault, the data cache memory does not commit the dispatching store data to system state.

Dispatches at retirement follow the same format for asserting the WB data valid to the ROB. Although the operation may dispatch successfully to the data cache memory, the MOB may not deallocate the operation immediately.

Figure 15:
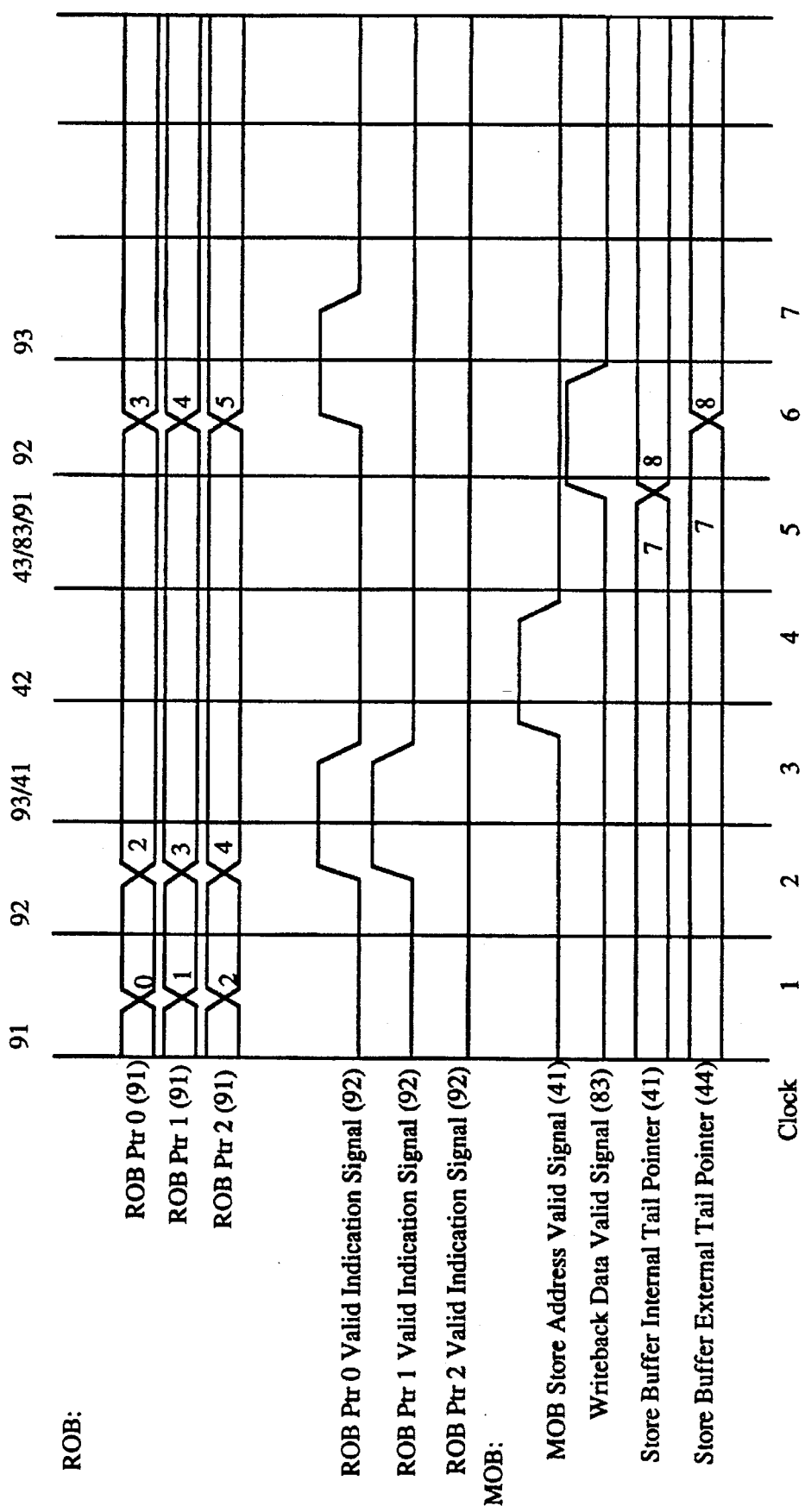
FIG. 15 is a timing diagram of the dispatching of a store operation at retirement according to one embodiment of the present invention.

FIG. 15 illustrates a MOB store address buffer STN/Store dispatch at retirement. The dispatch is initiated by a retirement pointer (in this case pointer 2) matching the oldest SAB entry and the valid bits qualifying that it is the oldest non-retired operation in the processor.

Referring to FIG. 15, using a clock by clock description of the STA/Store dispatch at retirement is shown. In clock 1, ROB retirement pointers indicate that the Pdst values 0–2 are evaluated for retirement. The pointer in the SAB points to the SBID of 7. This entry contains the operation with a Pdst value assigned to 2. The internal pointer reads the entry from the SAB of the MOB waiting for a qualification of dispatch at retirement, using valid bits from the ROB and a Pdst match.

In clock 2, ROB retirement pointer valid bits (indication signals) indicate that the first two Pdsts are to retire during the following cycle (if there are no faults) and the Pdst 2 (referred to by pointer 2) is the oldest non-retired operation in the processor. The retirement pointers are updated to reflect the deallocation of ROB entries 0 and 1. The STD operation, assigned Pdst 1, retires with the valid bit asserted this cycle.

In cycle 3, the MOB, identifying Pdst 2 as a STA ready to dispatch at retirement, arbitrates for the memory execution bus lines, and, when granted, drives the STN/Store information on the memory execution bus. Note that numerous other signals, such as linear address and SBID to the MIU, are not shown to avoid obscuring the present invention.

In clock cycle 4, the TLB translates the address and generates faults and trap information and the store data buffer asserts the store data to the data cache memory. In clock 5, the STA writeback (WB) valid indication from the MOB occurs. The MOB may not return the WB valid bit, but lets the data cache memory return when the external bus logic is complete. The STA and store are marked complete and, in this case, deallocate from the SAB. The retirement pointers latched in this clock are used for retirement in the next cycle. The MOB updates the internal read pointer to prepare for the next store dispatch.

In clock 6, the ROB valid bits are ready from the ROB array, indicating the completion of the STA from the previous cycle. The retirement pointers are updated to reflect the deallocation Of ROB entry 2. The external tail pointer is updated releasing the entry for re-use.

Split Store Dispatch

The MOB accommodates three forms of split memory accesses: MOB, data cache memory and page splits. The MOB split refers to an access that crosses a 64 aligned bit boundary and complicates ordering checks, but no special handling is required by the dispatch hardware. Page splits are known in the art as an access crossing two page boundaries. Data cache memory splits cross cache line boundaries, such that either modifies two cache lines, requires multiple data cache buffers specifying its return or does one of each.

To facilitate these dispatches, the MOB dispatches the operation twice. In one embodiment, these dispatches are done at retirement to reduce address translation complexity. The lower half of the operation writes the lower bytes of the access to the data cache memory and computes the high address and length. When the lower half of the operation completes, it writes a "done" bit in the array so that any subsequent redispatches from that entry will only dispatch the high half of the operation. The high half dispatch asserts the newly computed address and length to accomplish the final dispatch to the data cache memory.

Store Buffer Deallocation

Deallocation refers to the active moving of the external tail pointer by at most, one entry per clock. The external tail pointer is sent to the issue and fetch unit that controls allocation to signal the oldest entry in the buffer in the present invention, entries into the store buffer are deallocated by invalidating the status and data in the entry and signaling the issue and fetch unit that the entry is available through the external tail pointer.

Store Buffer Handling of Branch Mispredictions

When the processor has determined that it has started to execute operations from a mispredicted branch, the operations executed after that branch must not be allowed to retire. The ROB prevents their retirement by asserting one or more signals at the point just before the first of these operations is supposed to retire. All speculative operations are then flushed from the processor.

Since all senior store operations are committed to a processor state, they are preserved when the processor is cleared for the mispredicted branch. To accomplish this, the present invention provides a mechanism to restore its last allocation point to the SBID that has been allocated at the time of the mispredicted branch. In other words, the issue and fetch unit will start allocation of SBIDs and SAB entries from that point. Likewise, the SAB clears all the non-senior entries as if they had been deallocated.

In one embodiment, the SAB completes retirement of up to two micro-operations given guarantee bits by the ROB. Entry clearing within the SAB array is delayed until the next cycle. To prevent an erroneous dispatch, at retirement dispatches are both cleared from the dispatch pipe and inhibited. Senior store dispatches in the pipeline are preserved by both the MOB and the data cache memory since their state is not longer speculative.

Store Buffer Handling of Fault Recovery

When the ROB retires an operation that faults, it clears both the in-order and out-of-order sections of the processor with the assertion of a signal, a clear indication signal. Much of the out-of-order portion treats this signal and the signal used to clear the processor after branch recovery the same, clearing all resources much like a reset.

The store buffer, on the other hand, treats this signal differently. Before entering a microcode routine, all senior stores must be dispatched to the memory system. Therefore, on the assertion of this signal, the SAB asserts a stall signal to stop the allocation of SAB entries until all senior store operations are dispatched. The stall inhibits any issue of new operations into the out-of-order portion of the processor until it is removed. The SAB dispatches all senior operations, clearing the buffer of any committed state. The SAB then resets the array state and initializes the tail pointer into the SAB to zero, just as in reset. The stall signal is removed and allocation begins at location zero in the SAB.

Similar to the signal used to clear the processor at mispredicted branches, at retirement dispatches are cleared from the execution pipeline. Likewise, at retirement dispatches are prevented until the speculative state has cleared from the array.

Figure 16:
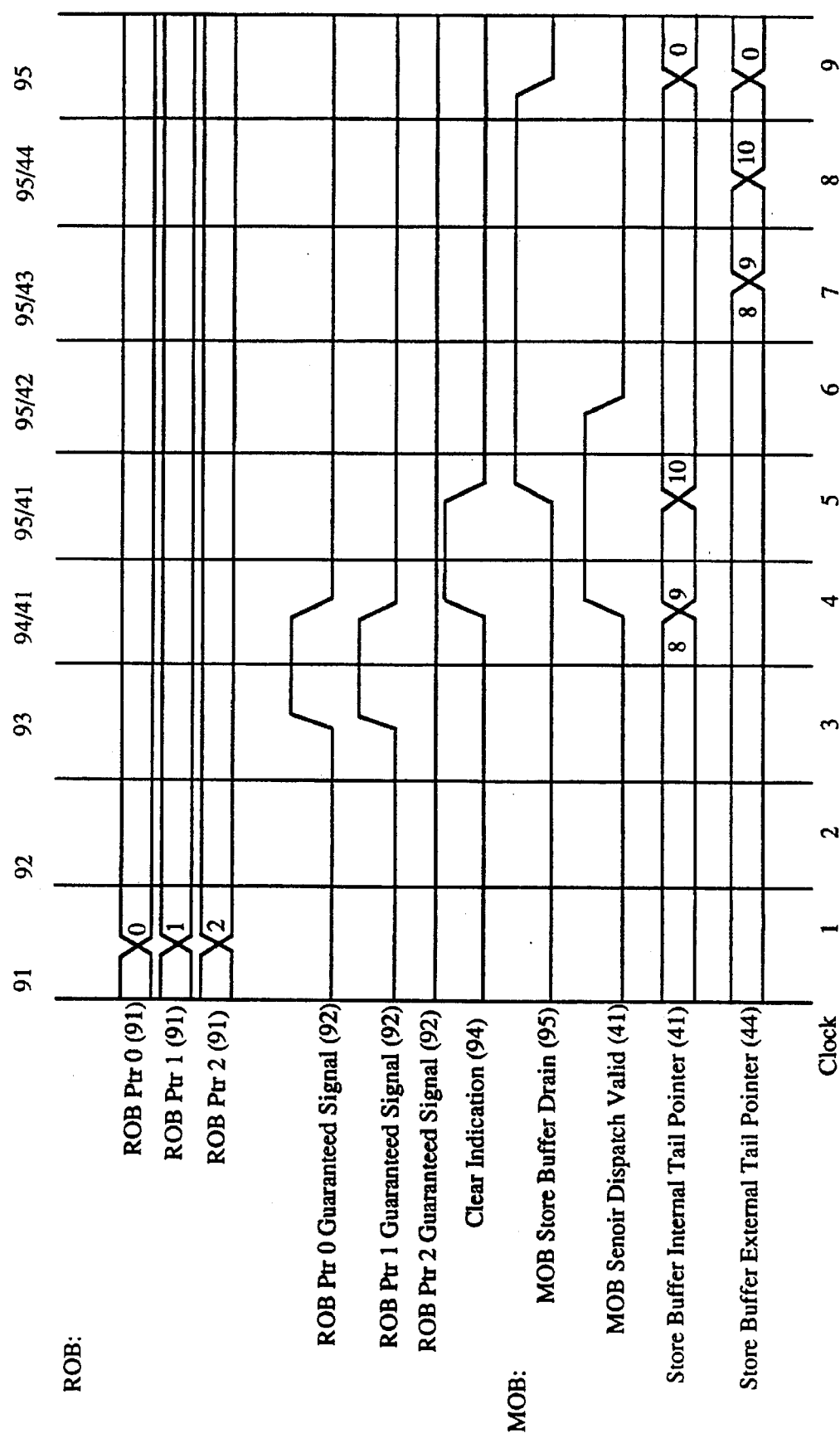
FIG. 16 is a timing diagram of the dispatching of senior store operations to clear the store buffer after a fault/interrupt has occurred.

FIG. 16 illustrates the pipeline where a drain for senior stores is required due to a fault indication signal. When a fault indication is asserted, the MOB stalls the allocation of store buffer entries until all senior stores have been committed.

Referring to FIG. 16, a clock by clock description of the store draining and SAB reset protocol is shown. In clock 1, Pdsts 0–2 are evaluated by the ROB for retirement. In clock 2, ROB valid bits (not shown) are asserted for all three Pdsts. In clock 3, guaranteed bits are asserted for only the first two Pdsts (0 and 1). Pdst 2 causes an indication signal. In clock 4, the current state of the MOB (after assertion of the guaranteed bits) includes two senior store entries. The MOB dispatches the first senior (SBID=8) when the indication signal is received. The senior store is not cleared from the pipe. The internal tail pointer in the MOB is updated to read the second senior (SBID=9). In clock 5, the second senior is dispatched, moving the internal tail pointer from 9 to 10. In clock 6, the second senior is at the next stage of memory execution and the first senior is at the following stage and deallocates. In clock 7, the first senior's deallocation becomes externally known through updating of the external tail pointer. The second senior also deallocates this cycle. In clock 8, the second senior's deallocation becomes externally known by updating the external tail pointer. Finally, in clock 9, both the internal and external tail pointers are reset and the drain signal goes low, indicating that the SAB is empty and reset.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for performing a store operation has been described.

We claim:

1. A method for performing a store operation with a processor in a computer system, said method comprising the steps of:

calculating an address for said store operation with a first execution unit;

obtaining data to be stored as a result of said store operation with a second execution unit, wherein the step of obtaining data is performed independently of calculating said address;

buffering said data and said address of said store operation in a buffer storage so as to combine said data and said address into a single operation;

retiring said store operation to commit said store operation to processor state independently of dispatch of said store operation to memory; and then dispatching said store operation to said memory in a memory pipeline decoupled from the first and second execution units, such that dispatch of said store operation occurs at any time after retirement of said store operation has begun and when resources in the processor and the computer system needed to perform dispatching are available.

2. The method defined in claim 1 wherein the step of retiring and the step of dispatching occur at the same time.

3. The method defined in claim 1 further comprising the steps of receiving faults and canceling said store operation during dispatching said store operation in response to said faults.

4. The method defined in claim 1 wherein said store operation comprises a split access and the step of dispatching comprises dispatching said store operation twice.

5. The method defined in claim 1 wherein the step of retiring includes providing an indication in said buffer to indicate that said store operation has been committed to processor state.

6. The method defined in claim 5 wherein the step of providing an indication includes setting at least one bit in said buffer.

7. The method defined in claim 1 further comprising the step of deallocating said store operation from said buffer after dispatching said store operation.

8. The method defined in claim 7 wherein said step of deallocating comprises indicating said store operation has been deallocated using a pointer internal to said buffer.

9. The method defined in claim 7 further comprising the step of receiving a completion indication once said store operation has been executed to memory prior to deallocating, wherein the step of deallocating is performed in response to said completion indication.

10. The method defined in claim 9 wherein said completion indication is received from an external bus in the computer system.

11. The method defined in claim 7 further comprising the step of maintaining memory ordering until said external bus indicates said store operation has been completed.

12. The method defined in claim 1 further comprising the steps of:

generating a first microinstruction for calculating the address and a second microinstruction for obtaining the data to be stored, wherein said first and second microinstructions are independently executable and generated in response to the store operation;

dispatching said first microinstruction to said first execution unit; and dispatching said second microinstruction to said second execution unit.

13. A method for performing a store operation with a processor in a computer system, wherein the processor includes a first data structure and an ordering mechanism for keeping track of all operations being performed by the processor and a second data structure for keeping track of store operations in the processor, said method comprising the steps of:

calculating an address for said store operation with a first execution unit;

obtaining data to be stored as a result of said store operation with a second execution unit, wherein the step of obtaining data is performed independently of calculating the address;

buffering said address and data in said second data structure so as to combine said address and said data into a single operation;

retiring said store operation to processor state independently of dispatch of said store operation to memory and in response to at least one signal from said ordering mechanism, wherein said store operation is committed to processor state; and dispatching said store operation to said memory in a memory pipeline decoupled from the first and second execution units, such that dispatch of said store operation occurs at any time after retirement of said store operation has begun and when resources in the processor and the computer system needed to perform dispatching are available.

14. The method defined in claim 13 wherein the step of retiring includes content address match (CAM) matching said store operation using a pointer in said first data structure being matched to a data field of said store operation in the second data structure and determining that operations preceding said store operation in program order have been designated for retirement.

15. The method defined in claim 13 wherein the step of retiring said store operation includes the step of determining when operations preceding said store operation in program order have been designated for retirement or retired, and further wherein said store operation is committed to processor state if said step of determining determines that operations preceding said store operation in program order have been designated for retirement or retired.

16. The method defined in claim 13 further comprising the step of identifying said store operation for retirement using a pointer in the first data structure and matching a data field of said store operation in said second data structure.

17. The method defined in claim 16 wherein the step of matching comprises content address match (CAM) matching said pointer with said data field.

18. The method defined in claim 16 wherein the step of dispatching occurs when said pointer to said store operation in said second data structure matches said data field in said first data structure.

19. The method defined in claim 18 further comprising the steps of setting a first validity indication in said first data structure after the step of calculating to indicate when address calculation has been completed and setting a second validity indication in said first data structure after the step of obtaining to indicate when said data has been obtained, and identifying said store operation for retirement using said pointer in said first data structure and matching said data field of said store operation in said second data structure, and further wherein the step of dispatching occurs when said data field of said store operation in said second data structure matches said pointer in said first data structure and said first validity indication and said second validity indication have been set.

20. The method defined in claim 19 wherein said first validity indication is set and said store operation is dispatched at the same time.

21. The method defined in claim 13 further comprising the steps of setting a first validity indication in said first data structure after the step of calculating to indicate when address calculation has been completed and setting a second validity indication in said first data structure after the step of obtaining to indicate when data has been obtained.

22. The method defined in claim 21 wherein the steps of setting a first validity indication occurs when said store operation is dispatched to memory.

23. The method defined in claim 13 further comprising the steps of:

generating a first microinstruction for calculating the address and a second microinstruction for obtaining the data to be stored, wherein said first and second microinstructions are independently executable and generated in response to the store operation;

dispatching said first microinstruction to said first execution unit; and dispatching said second microinstruction to said second execution unit.

24. A method for performing a plurality of store operations with a processor in a computer system, said method comprising the steps of:

performing address calculations to generates addresses and data calculations to obtain data for said plurality of store operations using at least one execution unit buffer each of said plurality of store operations in a buffer storage as address and data calculations for each of said plurality of store operations are completed;

committing portion of said plurality of store operations to processor state, wherein the buffer stores said portion of store operations committed to processor state and store operations in said plurality of store operations other than said portion, such that said portion of the plurality of store operations are committed to processor state prior to and independent of dispatch and said buffer storage contains retired and non retired store operations; and then dispatching the portion of said plurality of store operations to memory in a memory pipeline decoupled from said at least one execution unit in response to an even such that dispatch of each of the portion of said plurality of store operations occurs at any time after retirement of said each of the portion of said plurality of store operations has begun and when resources in the processor and the computer system needed to perform dispatching are available.

25. The method defined in claim 24 further comprising the steps of preventing operations from being committed to processor state until said portion has been dispatched to memory.

26. The method defined in claim 24 further comprising the step of clearing said buffer storage of store operations not committed to processor state.

27. The method defined in claim 26 further comprising the step of resetting said buffer storage to pointer to a predetermined entry in the buffer storage.

28. The method defined in claim 24 wherein said event comprises a fault.

29. The method defined in claim 24 wherein said event comprises an interrupt.

30. A method for performing a store instruction in a computer system comprising the steps of:

creating a first operation and a second operation in response to said store instruction, whereto said first operation includes an address calculation for said store instruction and said second operation includes a data calculation for said store instruction;

executing said first operation and said second operation independently with a first execution unit and a second execution unit respectively;

recombining results of said first operation and said second operation in a buffer storage;

dispatching results from execution of said first operation and said second operation to memory as a single operation in a memory pipeline decoupled from the first execution unit and second execution unit, such that dispatch of said sing operation occurs at any time after retirement of said single operation has begun and when resources in the processor and the computer system needed to perform dispatching are available.

31. A computer system comprising:

a bus;

a main memory coupled to said bus for storing digital data;

an issue unit coupled to said bus, wherein said issue unit issues a first operation and a second operation in response to a store instruction, wherein said first operation includes an address calculation for said store operation and said second operation includes a data calculation for said store operation;

at least one execution unit coupled to said bus, wherein said at least one execution unit executes said first operation and said second operation independently;

a memory control unit coupled to said bus to combine an address generated by executing said first operation and data produced by executing said second operation into a single operation and stores the single operation in multiple storage arrays;

a retirement mechanism coupled to the memory control unit to retire operations issued by the issue unit, wherein the retirement mechanism retires the first operation and the second operation independently of dispatch of the store to memory once execution has completed; and a dispatching mechanism coupled to the memory control unit and the bus, wherein the dispatching mechanism dispatches the single operation to a memory to complete the single operation at any time after retirement of said single operation has begun and when resources in the processor and the computer system needed to perform dispatching are available in a manner after, yet independent of retirement and decoupled from the issue unit, said at least one execution unit, and the memory control unit after the single operation has been created.

32. A processor for use in a computer system, wherein said processor executes a plurality of instructions, the plurality of instructions including at least one store instruction for storing data to a memory, said processor comprising:

a bus;

an issue unit coupled to the bus, wherein the issue unit issues at least one operation in response to said at least one store instruction;

a memory execution unit coupled to the bus, wherein said memory execution unit executes said at least one operation to produce an address and data for said at least one store instruction;

a buffer array coupled to said memory execution unit for buffering said at least one operation prior to dispatch to said memory;

retirement mechanism coupled to the buffer array commits said at least one operation to processor state independently of dispatch of said at least one operation to said memory; and a dispatcher coupled to the bus and the buffering array to dispatch said at least one operation to said memory at any time after retirement of said at least one operation has begun and when resources in the processor and the computer system needed to perform dispatching are available, wherein dispatch of said at least one operation is decoupled from execution of said at least one operation by said memory execution unit to complete said at least one store instruction.

33. The processor defined in claim 32 further comprising a fault handling mechanism coupled to the dispatcher wherein said fault handling mechanism receives fault information and cancels said at least one operation during dispatching in response to said fault information indicating a fault occurred during execution.

34. The processor defined in claim 32 wherein said dispatcher dispatches said at least one operation twice if said at least one operation is a split access.

35. The processor defined in claim 32 wherein said buffer array includes at least one storage element, and wherein said processor further comprises a memory control unit, wherein said memory control unit sets said at least one storage element to indicate that said at least one operation has been committed to processor state.

36. The processor defined in claim 32 further comprising means for deallocating said at least one operation in said buffer array after being dispatched.

37. The processor defined in claim 36 wherein said means for deallocating comprises a pointer internal to said buffer array to indicate that said at least one operation has been deallocated.

38. The processor defined in claim 32 wherein said dispatcher includes means for dispatching said at least one operation at retirement.

39. The processor defined in claim 32 wherein said issue unit issues two independently executable operations, wherein one of said two independently executable operations calculates said address when executed and the other of said two independently executable operations obtains the data when executed.

40. A method for performing a plurality of store operations with a processor in a computer system, said method comprising the steps of:

buffering each of the plurality of store operations in buffer storage as address and data calculations for each of the plurality of store operations are complete;

committing a portion of the plurality of store operations to processor state, wherein the buffer means includes said portion of store operations committed to processor state and store operations in said plurality of store operations other than said portion, such that said portion of the plurality of store operations are committed to processor state prior to dispatch; and dispatching the portion of the plurality of store operations to memory when an event occurs that causes said store operations in said plurality of store operations other than said portion to be flushed from the buffer storage, such that dispatch of each of the portion of said plurality of store operations occurs at any time after retirement of said each of the portion of said plurality of store operations has begun and when resources in the processor and the computer system needed to perform dispatching are available.

41. A processor for use in a computer system, wherein the processor executes a plurality of instructions, the plurality of instructions including at least one store instruction, said processor comprising:

bus means for communicating information;

instruction issue means coupled to the bus means for issuing a plurality of operations in response to the plurality of instructions, wherein said instruction issue means issues at least one store operation in response to said at least one store instruction;

address calculation means coupled to said instruction issue means for calculating an address for said at least one store operation;

data gathering means coupled to said instruction issue means for obtaining data to be stored as a result of said at least one store operation;

buffer means coupled to said address calculation means and said data gathering means for buffering said at least one store operation in a first data structure;

retirement means coupled to said buffer means for retiring said at least one store operation, wherein said at least one store operation is committed to processor state independently and separate from dispatch of said at least one store operation to memory; and dispatching means coupled to said buffer means for dispatching said at least one store operation to memory at any time after retirement of said at least one store operation has begun and when resources in the processor and the computer system needed to perform dispatching are available, wherein dispatching of said at least one store operation is decoupled from execution of said at least one store operation.

42. The processor defined in claim 41 wherein said means for retiring includes means for committing said at least one store operation to processor state when operations preceding said at least one store operation in program order have been designated for retirement or retired.

43. The processor defined in claim 41 wherein said means for retiring generates a pointer that identifies said at least one store operation for retirement in said first data structure and matches the pointer to said at least one store operation to indicate that the store operation is to be retired.

44. The processor defined in claim 43 wherein said pointer is set after address calculation.

45. The processor defined in claim 43 wherein said dispatching means dispatches said at least one store operation when said pointer to the store operation matches a data field in said first data structure.

46. The processor defined in claim 45 further comprising operation managing means for managing execution status of said plurality of instructions in the processor, wherein said first data structure includes validity indications for said plurality of operations, wherein said operation managing means sets a validity indication corresponding to said at least one store operation to indicate when address calculation has been completed and sets a second validity indication in said first data structure after data has been obtained, and further wherein said means for dispatching dispatches said at least one store operation when said data field of said at least one store operation in a second data structure matches said pointer in said first data structure and said first validity indication and said second validity indication have been set.

47. The processor defined in claim 46 wherein said first validity indication is set and said at least one store operation is dispatched at the same time.

48. The processor defined in claim 41 further comprising operation managing means for managing execution status of said plurality of instructions in said processor, wherein said first data structure includes validity indications for each of said plurality of operations, wherein said operation managing means sets a validity indication corresponding to said at least one operation to indicate when an address calculation has been completed and sets a second validity indication in said first data structure after data has been obtained.

49. The processor defined in claim 48 wherein said first validity indication is set when said at least one store operation is dispatched to memory.

* * * * *

UNITED STATES PATENT AND TRADEMARK OFFICE
CERTIFICATE OF CORRECTION

PATENT NO. : 5,664,137
DATED : September 2, 1997
INVENTOR(S) : Abramson, et al

It is certified that error appears in the above-identified patent and that said Letters Patent is hereby corrected as shown below:

On the title page, item [75] Inventors: "Atig A. Bajwa" should read -- Atiq A. Bajwa --.

Signed and Sealed this

Second Day of December, 1997

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,664,137
DATED : September 2, 1997
INVENTOR(S) : Abramson et al.

It is certified that error appears in the above-identified patent and that said Letters Patent is hereby corrected as shown below:

In column 6 at line 19 delete "306" and insert --308--

In column 16 at line 58 delete "STN/Store" and insert --STA/Store--

In column 17 at line 14 delete "STN/Store" and insert --STA/Store--

In column 17 at line 26 delete "dock" and insert --clock--

Signed and Sealed this

Seventeenth Day of March, 1998

Attest:

BRUCE LEHMAN

Attesting Officer

Commissioner of Patents and Trademarks